US012327917B2

(12) United States Patent
Jung et al.

(10) Patent No.: US 12,327,917 B2
(45) Date of Patent: Jun. 10, 2025

(54) ELECTRONIC DEVICE HAVING ANTENNA

(71) Applicant: LG ELECTRONICS INC., Seoul (KR)

(72) Inventors: Kangjae Jung, Seoul (KR); Ilnam Cho, Seoul (KR); Kukheon Choi, Seoul (KR); Byeongyong Park, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 18/002,139

(22) PCT Filed: Jun. 19, 2020

(86) PCT No.: PCT/KR2020/007960
§ 371 (c)(1),
(2) Date: Dec. 16, 2022

(87) PCT Pub. No.: WO2021/256589
PCT Pub. Date: Dec. 23, 2021

(65) Prior Publication Data
US 2023/0231322 A1 Jul. 20, 2023

(51) Int. Cl.
*H01Q 21/08* (2006.01)
*H01Q 1/24* (2006.01)
(Continued)

(52) U.S. Cl.
CPC ............ *H01Q 21/08* (2013.01); *H01Q 1/243* (2013.01); *H01Q 1/38* (2013.01); *H01Q 1/46* (2013.01)

(58) Field of Classification Search
USPC .......................................................... 343/702
See application file for complete search history.

(56) References Cited

U.S. PATENT DOCUMENTS 6,417,816 B2 * 7/2002 Sadler ...................... H01Q 1/38
343/702
7,724,201 B2 * 5/2010 Nysen .................. H01Q 1/2275
343/820
(Continued)

FOREIGN PATENT DOCUMENTS

JP 2015-211425 11/2015
JP 2015211425 A * 11/2015
(Continued)

OTHER PUBLICATIONS

PCT International Application No. PCT/KR2020/007960, International Search Report dated Mar. 16, 2021, 4 page.

*Primary Examiner* — Hoang V Nguyen
*Assistant Examiner* — Brandon Sean Woods
(74) *Attorney, Agent, or Firm* — LEE, HONG, DEGERMAN, KANG & WAIMEY

(57) ABSTRACT

Provided is an electronic device having an antenna according to one embodiment. The electronic device may comprise: an antenna disposed on a substrate disposed inside the electronic device and operable to resonate in a plurality of frequency bands; and a feeding unit disposed on the substrate and composed of a feeding line feeding a signal to the antenna and a ground line operating as a ground. The antenna may comprise: a first radiator in which a first metal pattern connected to the feeding line and a second metal pattern connected to the ground line are formed in a first axial direction of the substrate; and a second radiator in which a third metal pattern connected to the feeding line is formed in a second axial direction of the substrate.

18 Claims, 23 Drawing Sheets

(51) Int. Cl.
*H01Q 1/38* (2006.01)
*H01Q 1/46* (2006.01)

(56) References Cited

U.S. PATENT DOCUMENTS

| | | | | |
|---|---|---|---|---|
| 8,115,681 | B2 * | 2/2012 | Ryou | H01Q 9/42 343/702 |
| 2009/0207092 | A1 | 8/2009 | Nysen et al. | |
| 2013/0229311 | A1 * | 9/2013 | Chi | H01Q 1/38 343/700 MS |
| 2014/0104157 | A1 * | 4/2014 | Burns | H01Q 1/38 343/702 |

FOREIGN PATENT DOCUMENTS

| | | |
|---|---|---|
| KR | 2015-0104509 | 9/2015 |
| KR | 10-1962821 | 7/2019 |
| KR | 2019-0129026 | 11/2019 |

* cited by examiner (a)

(b)

BOW-TIE DIPOLE MODE (0.69~0.8GHz)

MONOPOLE MODE (0.9~1.4GHz)

TRIANGLE PATCH (1.7~4.5GHz)

ELECTRONIC DEVICE HAVING ANTENNA

CROSS-REFERENCE TO RELATED APPLICATION(S)

This application is the National Stage filing under 35 U.S.C. 371 of International Application No. PCT/KR2020/007960, filed on Jun. 19, 2020, the contents of which is hereby incorporated by reference herein in its entirety.

TECHNICAL FIELD

The present disclosure relates to an electronic device having antennas. A specific implementation relates to a transparent antenna that operates in an LTE band and a 5G Sub6 band.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated for 5G communication services.

In this regard, mobile terminals may be configured to provide 5G communication services in various frequency bands. Recently, attempts have been made to provide 5G communication services using a Sub-6 band that is a band of 6 GHz or less. In the future, however, it is also expected to provide 5G communication services by using a millimeter-wave (mmWave) band in addition to the Sub-6 band for a faster data rate.

In order to provide 4G LTE communication service and 5G communication service, an antenna may be disposed inside an electronic device or inside a display. In relation to this, an antenna may be implemented without interference with existing antennas disposed inside the electronic device, by utilizing a wide space inside the display. However, such a transparent antenna provided in a display has the problem of low conductivity because it is implemented as a metal mesh grid structure or a transparent material.

Moreover, antenna bandwidth expansion is required to cover LTE low bands. To this end, an increase in antenna size is necessary.

DISCLOSURE OF INVENTION

Technical Problem

The present disclosure is directed to solving the aforementioned problems and other drawbacks. Another aspect is to provide an antenna of a transparent material that operates in a 4G LTE band and a 5G Sub6 band.

Another aspect of the present disclosure is to propose an antenna structure that operates as a single antenna module over a wide band that extends to 4G LTE low band and a 5G Sub6 band.

Another aspect of the present disclosure is to propose a multi-mode/multi-band antenna structure that operates as a single antenna module over a wide band that extends to 4G LTE low band and a 5G Sub6 band.

Another aspect of the present disclosure is to improve communication performance by disposing a plurality of transparent antennas on a display of an electronic device.

Solution to Problem

To achieve the above or other aspects, an electronic device having an antenna according to one implementation is provided. The electronic device may include: an antenna disposed on a substrate disposed inside the electronic device and operable to resonate in a plurality of frequency bands; and a feeding unit disposed on the substrate and composed of a feeding line feeding a signal to the antenna and ground lines operating as a ground. The antenna may include: a first radiator in which a first metal pattern connected to the feeding line and a second metal pattern connected to the ground lines are formed in a first axial direction of the substrate; and a second radiator in which a third metal pattern connected to the feeding line is formed in a second axial direction of the substrate.

In one embodiment, the antenna may operate to resonate in a first frequency band by the first radiator, and operate to resonate in a second frequency band higher than the first frequency band by the second radiator.

In one embodiment, the first radiator may be a bow-tie antenna which is formed in such a way that the width of the first metal pattern and the second metal pattern increases at a predetermined angle.

In one embodiment, the second radiator may be a monopole antenna which is formed in such a way that the width of the third metal pattern increases in the second axial direction.

In one embodiment, the monopole antenna may be configured as a loaded monopole antenna whose end portion is formed of at least one of a circular structure, a semi-circular structure, a triangular structure, and a tapered structure.

In one embodiment, the first metal pattern and second metal pattern of the first radiator may have a slit of a predetermined length and width.

In one embodiment, the feeding unit may be formed of a structure in which the ground lines are spaced apart from each other by a predetermined distance on opposite sides of the feeding line, the first metal pattern of the first radiator may further include a matching stub pattern formed perpendicular to the slit, and the width of the matching stub pattern may be smaller than the width of the feeding line.

In one embodiment, the feeding unit may be formed of a structure in which the ground lines are spaced apart from each other by a predetermined distance on opposite sides of the feeding line, and the antenna may further include a third radiator which is formed of a fourth metal pattern spaced a predetermined distance apart from one of the ground lines.

In one embodiment, the third radiator may be formed of a parasitic metal pattern having a triangular shape, and resonate in a third frequency band higher than the second frequency band.

In one embodiment, the antenna may operate to resonate in a fourth frequency band higher than the first frequency band and the third frequency band by the first radiator, and the first radiator may operate to resonate in a fourth frequency band in a higher order mode of a bow-tie antenna corresponding to the first radiator.

In one embodiment, the first to third radiators constituting the antenna may be implemented as a transparent material metal or a metal mesh grid.

In one embodiment, the electronic device may further include a transceiver circuit formed in an un-transparent region and configured to be connected to the feeding line and transmit signals in a plurality of frequency bands, wherein the transceiver circuit transmits signals to the antenna through the feeding line to radiate signals of a low band LB to high band HB of an LTE communication system and signals of a 5G Sub6 band through the antenna.

In one embodiment, the antenna may include a plurality of antennas disposed in different regions, and the electronic device may further include a processor operably coupled to the transceiver circuit and configured to control the transceiver circuit, wherein the processor performs multiple input multiple output (MIMO) through two or more of the plurality of antennas.

In one embodiment, the processor may control the transceiver circuit to perform carrier aggregation using at least one of the first to third radiators of the antenna.

In one embodiment, the antenna may include a plurality of antennas disposed in different regions. The processor controls the transceiver circuit to perform multiple input multiple output (MIMO) through two or more of the plurality of antennas and perform carrier aggregation (CA) by using at least one of the first to third radiators of the antenna.

In one embodiment, the electronic device may be a mobile terminal, signage, display equipment, transparent AR/VR equipment, a vehicle, or a wireless audio/video device, and the antenna may be a transparent antenna disposed on a display or inside the display.

Another aspect of the present disclosure provides an antenna module including a transparent antenna provided in a display, the antenna module including: a transparent antenna disposed on a transparent substrate, and operating to resonate in a plurality of frequency bands; and a feeding unit disposed on the transparent substrate, and including a feeding line for feeding a signal to the transparent antenna and ground lines operating as a ground, wherein the transparent antenna including: a first radiator in which a first metal pattern connected to the feeding line and a second metal pattern connected to the ground lines are formed in a first axial direction of the substrate; and a second radiator in which a third metal pattern connected to the feeding line is formed in a second axial direction of the substrate.

In one embodiment, the first radiator may be a bow-tie antenna which is formed in such a way that the width of the first metal pattern and the second metal pattern increases at a predetermined angle, and the second radiator may be a monopole antenna which is formed in such a way that the width of the third metal pattern increases in the second axial direction.

In one embodiment, the first metal pattern and second metal pattern of the first radiator may have a slit of a predetermined length and width, the feeding unit may be formed of a structure in which the ground lines are spaced apart at both sides of the feeding line at a predetermined interval, the first metal pattern of the first radiator may further include a matching stub pattern formed perpendicular to the slit, and the width of the matching stub pattern may be narrower than the width of the feeding line.

The feeding unit may be formed of a structure in which the ground lines are spaced apart from each other by a predetermined distance on opposite sides of the feeding line, and the transparent antenna may further include a third radiator which is connected to one of the ground lines and formed of a fourth metal pattern spaced a predetermined distance apart from one of the ground lines, wherein the third radiator is formed of a parasitic metal pattern having a triangular shape, and resonates in a third frequency band higher than the second frequency band.

Advantageous Effects of Invention

Technical effects of such an electronic device having a transparent antenna will be described below.

According to an embodiment, an antenna of a transparent material may be provided which operates in a 4G LTE band and a 5G Sub6 band.

According to an embodiment, it is possible to provide an antenna structure that operates in a wide band with a single antenna module up to 4G LTE low band and 5G Sub6 band through a combined structure of a monopole and a bow-tie radiator.

According to an embodiment, a multi-mode/multi-band antenna structure may be provided which operates as a single antenna module over a wide band that extends to a 4G LTE low band and a 5G Sub6 band through a combination structure of a monopole and a bow-tie radiator.

According to an embodiment, a plurality of transparent antennas may be disposed on a display of an electronic device, and communication performance may be improved through multiple input multiple output (MIMO) and/or carrier aggregation (CA).

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
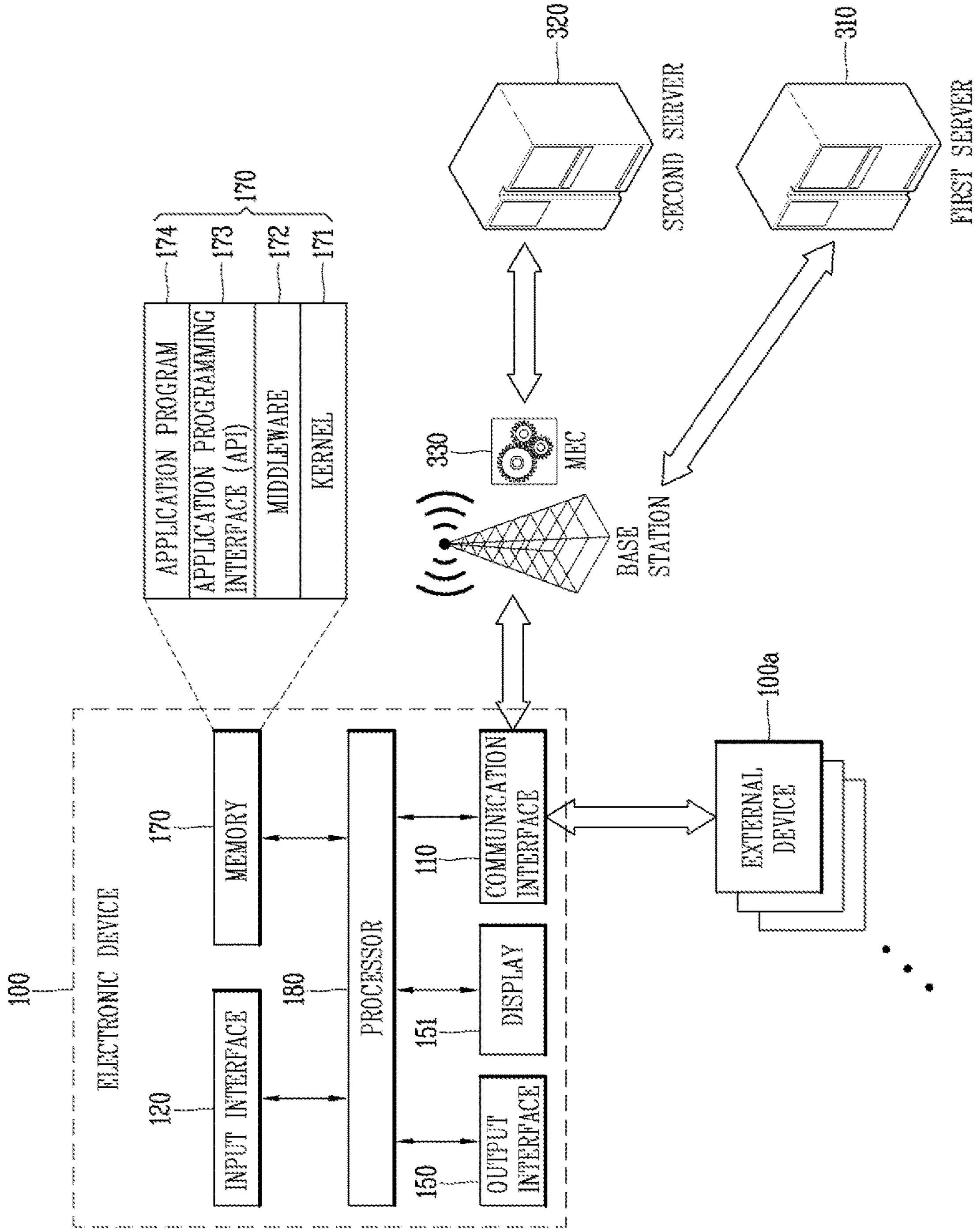
FIG. 1 is a view illustrating a configuration for describing an electronic device in accordance with one embodiment, and an interface between the electronic device and an external device or server.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 2A:
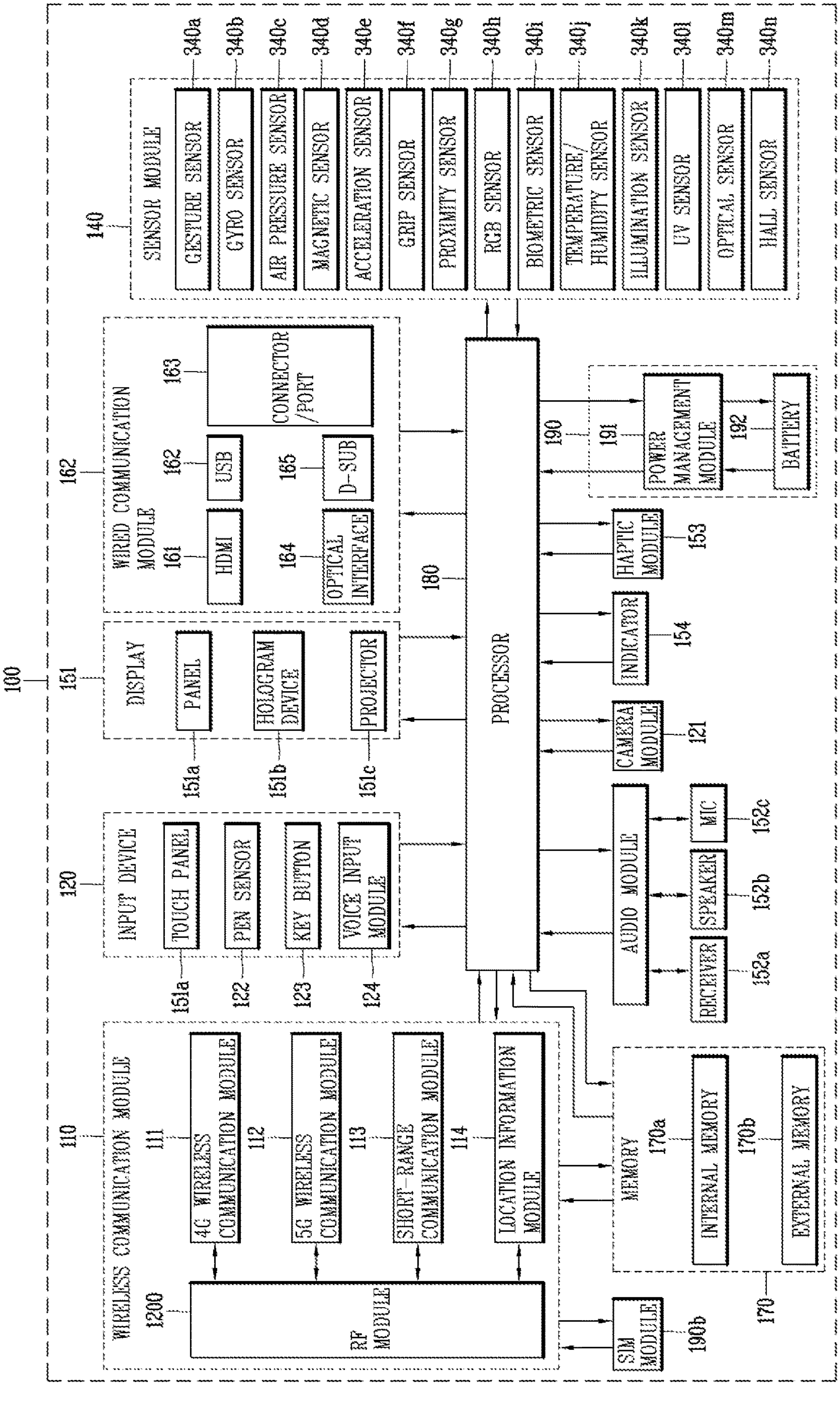
FIG. 2A is a view illustrating a detailed configuration of the electronic device of FIG. 1.
Figure 2B:
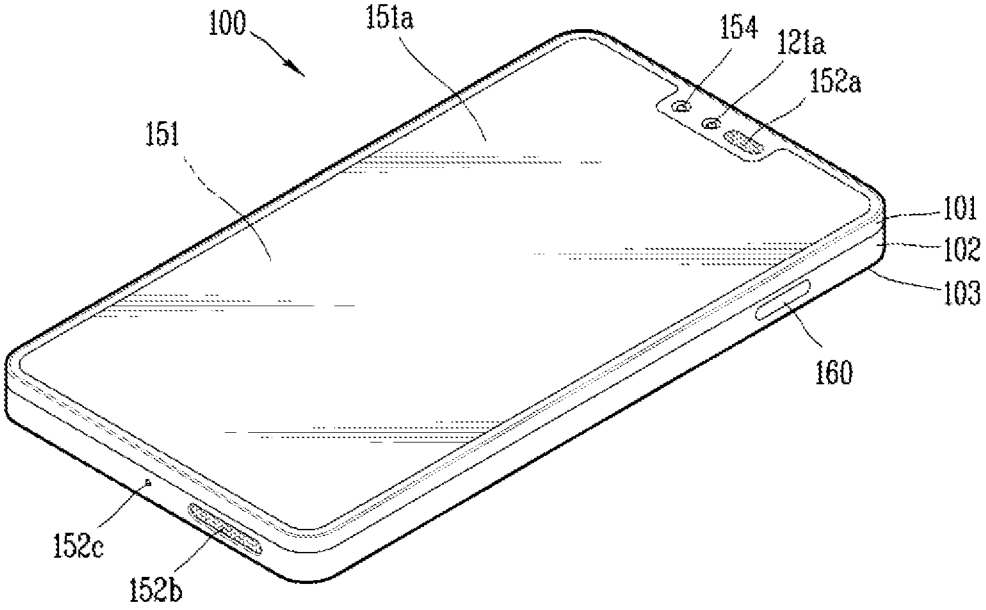
FIGS. 2B and 2C are conceptual views illustrating one example of an electronic device according to the present disclosure, viewed from different directions.
Figure 2C:
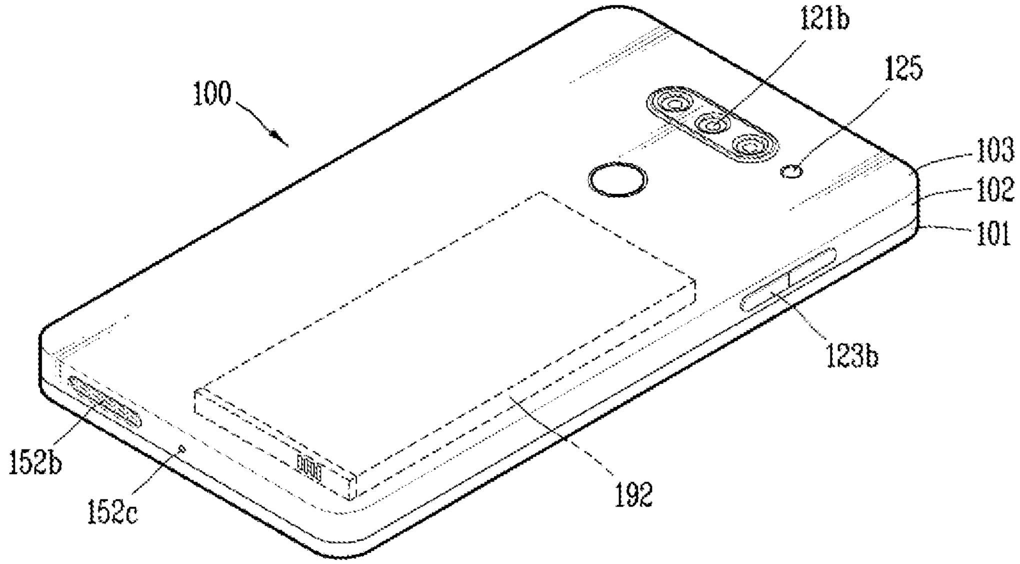

FIG. 1 is a view illustrating a configuration for describing an electronic device in accordance with one embodiment, and an interface between the electronic device and an external device or server. Meanwhile, referring to FIGS. 2A to 2B, FIG. 2A is a view illustrating a detailed configuration of the electronic device of FIG. 1. FIGS. 2B and 2C are conceptual views illustrating one example of an electronic device according to the present disclosure, viewed from different directions.

Referring to FIG. 1, the electronic device 100 may include a communication interface 110, an input interface (or an input device) 120, an output interface (or an output device) 150, and a processor 180. Here, the communication interface 110 may refer to the wireless communication module 110. The electronic device 100 may further include a display 151 and a memory 170. It is understood that implementing all of the illustrated components illustrated in FIG. 1 is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1 and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) architecture. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE refarming. In some examples, a Sub-6 frequency band that is a band of 6 GHz or less may be used as the 5G frequency band.

In contrast, a millimeter-wave (mmWave) band may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity to the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112, respectively.

The short-range communication module 113 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151*a*, and the like. The input device 120 may include a camera module 121 or an image input unit for obtaining images or video, a microphone 152*c* or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340*a*, a gyro sensor 340*b*, an air pressure sensor 340*c*, a magnetic sensor 340*d*, an acceleration sensor 340*e*, a grip sensor 340*f*, and a proximity sensor 340*g*, a color sensor 340*h* (e.g. RGB (red, green, blue) sensor), a bio-sensor 340*i*, a temperature/humidity sensor 340*j*, an illuminance sensor 340*k*, an ultra violet (UV) sensor 3401, a light sensor 340*m*, and a hall sensor 340*n*. The sensor module 140 may also include at least one of a finger scan sensor, an ultrasonic sensor, an optical sensor (for example, camera 121), a microphone (see 152*c*), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151*a*, a hologram device 151*b*, a projector 151*c*, and/or a control circuit for controlling them. In this regard, the panel may be implemented to be flexible, transparent, or wearable. The panel may include the touch panel 151*a* and one or more modules. The hologram device 151*b* may display a stereoscopic image in the air by using light interference. The projector 151*c* may display an image by projecting light onto a screen. The screen may be located inside or outside the electronic device 100, for example.

The audio module 152 may interwork with the receiver 152*a*, the speaker 152*b*, and the microphone 152*c*. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory 170 may include a volatile memory and/or a non-volatile memory. The memory 170 may also include an internal memory 170*a* and an external memory 170*b*. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100*a*, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100*a*, the first server 310 and the second server 320. According to an implementation, when the electronic device 100 should perform a specific function or service automatically or at a request, the electronic device 100 may request another device (e.g., the external device 100*a*, the first server 310, and the second server 320) to perform at least some functions associated therewith, instead of executing the function or service on its own or additionally. The another electronic device (e.g., the external device 100*a*, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100*a*, a first server 310, and a second server 320. The electronic device 100 may be functionally connected to at least one external device 100*a*, and may control contents or functions of the electronic device 100 based on information received from the at least one external device 100*a*. According to an implementation, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an implementation, the electronic device 100 may be connected to at least one external device 100*a* through a wired or wireless communication interface to receive or transmit information. For example, the electronic device 100 and the at least one external device 100*a* include a near field communication (NFC), a charger (e.g., Information can be received or transmitted in a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100*a* which is an assistant device linked with the electronic device 100, may be a device designed for various purposes, such as convenience of use, more attractive appearance, enhancement of usability, etc. of the electronic device 100. At least one external device 100*a* may or may not be in physical contact with the electronic device 100. According to one implementation, the at least one external device 100*a* may be functionally connected to the electronic device 100 using a wired/wireless communication module to control information for controlling content or a function in the electronic device 100.

Meanwhile, the first server 310 may include a server or a cloud device for services related to the at least one external device 100*a* or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

Referring to FIGS. 2B and 2C, the disclosed electronic device 100 includes a bar-like terminal body. However, the electronic device 100 may alternatively be implemented in any of a variety of different configurations. Examples of such configurations include watch type, clip-type, glasses-type, or folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally disposed between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some implementations, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may be completely covered by the rear cover 103. On the other hand, the rear cover 103 may have an opening for exposing the camera 121*b* or the audio output module 152*b* to the outside.

The electronic device 100, referring to FIGS. 2A to 2C, may include a display 151, first and second audio output modules 152*a*, 152*b*, a proximity sensor 141, an illumination sensor 152, an optical output module 154, first and second cameras 121*a*, 121*b*, first and second manipulation units 123*a*, 123*b*, a microphone 152*c*, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a processor 180 may generate a control command corresponding to the touch. Contents input in the touch manner may be characters, numbers, instructions in various modes, or a menu item that can be specified.

In this way, the display 151 may form a touch screen together with the touch sensor, and in this case, the touch screen may function as the user input unit (123, see FIG. 2A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may be configured to output light for indicating an event generation. Examples of the event generated in the electronic device 100 may include a message reception, a call signal reception, a missed call, an alarm, a schedule notice, an email reception, information reception through an application, and the like. When a user has checked a generated event, the processor 180 may control the optical output module 154 to stop the light output.

The first camera 121*a* may process image frames such as still or moving images obtained by the image sensor in a capture mode or a video call mode. The processed image frames can then be displayed on the display 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*. The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained. The flash 125 may be disposed adjacent to the second camera 121*b*. When an image of a subject is captured with the camera 121*b*, the flash 125 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication. The microphone 152*c* may be configured to receive the user's voice, other sounds, and the like. The microphone 152*c* may be provided at a plurality of places, and configured to receive stereo sounds.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 2A) for supplying power to the electronic device 100. The power supply unit 190 may include a batter 191 which is mounted in the terminal body or detachably coupled to an outside of the terminal body.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the spirit or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be an mmWave band but is not limited thereto, and may be changed depending on applications.

Figure 3A:
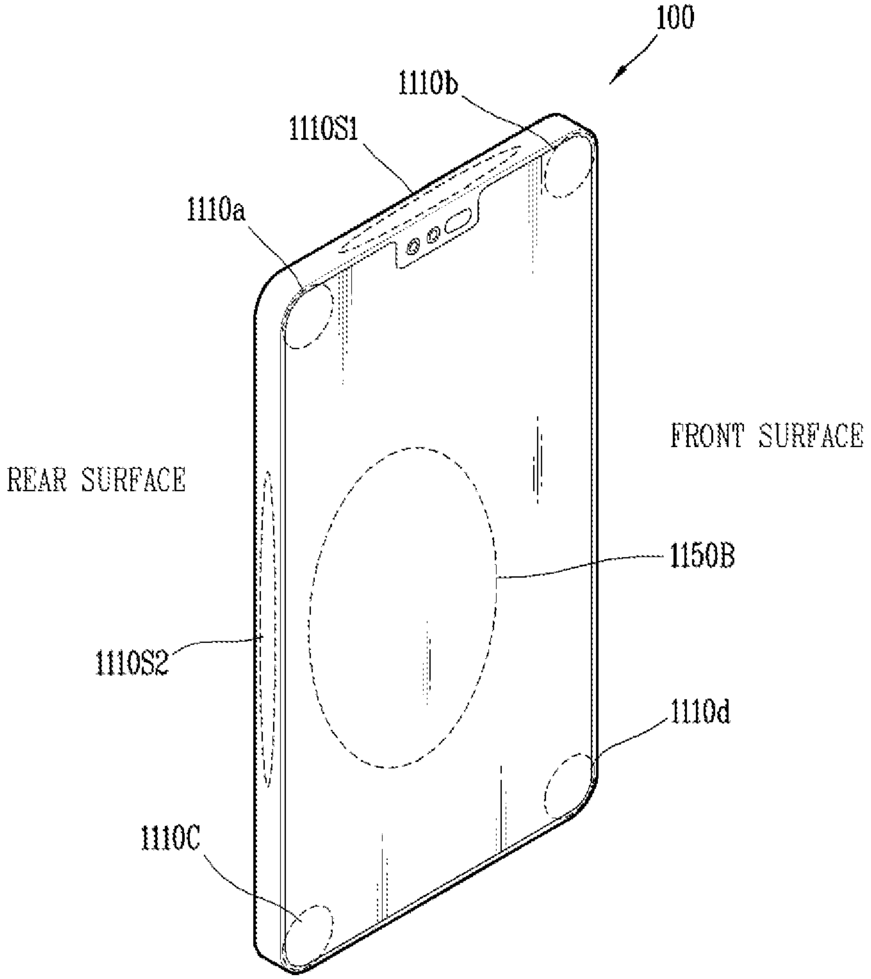
FIG. 3A illustrates an exemplary configuration in which a plurality of antennas of the electronic device can be arranged.

FIG. 3A illustrates an exemplary configuration in which a plurality of antennas of the electronic device can be arranged. Referring to FIG. 3, a plurality of antennas 1110*a* to 1110*d* may be arranged in the electronic device 100 or on a front surface of the electronic device 100. In this regard, the plurality of antennas 1110*a* to 1110*d* may be implemented in a form printed on a carrier inside the electronic device or may be implemented in a form of system-on-chip (Soc) together with an RFIC. The plurality of antennas 1110*a* to 1110*d* may be disposed on the front surface of the electronic device in addition to the inside of the electronic device. Here, the plurality of antennas 1110*a* to 1110*d* disposed on the front surface of the electronic device 100 may be implemented as transparent antennas embedded in the display.

A plurality of antennas 1110S1 and 1110S2 may also be disposed on side surfaces of the electronic device 100. In this regard, 4G antennas in the form of conductive members may be disposed on the side surfaces of the electronic device 100, slots may be formed in conductive member regions such that the plurality of antennas 1110*a* to 1110*d* can radiate 5G signals through the slots. Antennas 1150B may additionally be disposed on the rear surface of the electronic device 100 to radiate 5G signals rearward.

In some examples, at least one signal may be transmitted or received through the plurality of antennas 1110S1 and 1110S2 on the side surfaces of the electronic device 100. In some examples, at least one signal may be transmitted or received through the plurality of antennas 1110*a* to 1110*d*, 1150B, 1110S1, and 1110S2 on the front surface and/or the side surfaces of the electronic device 100. The electronic device may perform communication with a base station through any one of the plurality of antennas 1110*a* to 1110*d*, 1150B, 1110S1, and 1110S2. Alternatively, the electronic device may perform MIMO communication with a base station through two or more antennas among the plurality of antennas 1110*a* to 1110*d*, 1150B, 1110S1, 1110S2.

Figure 3B:
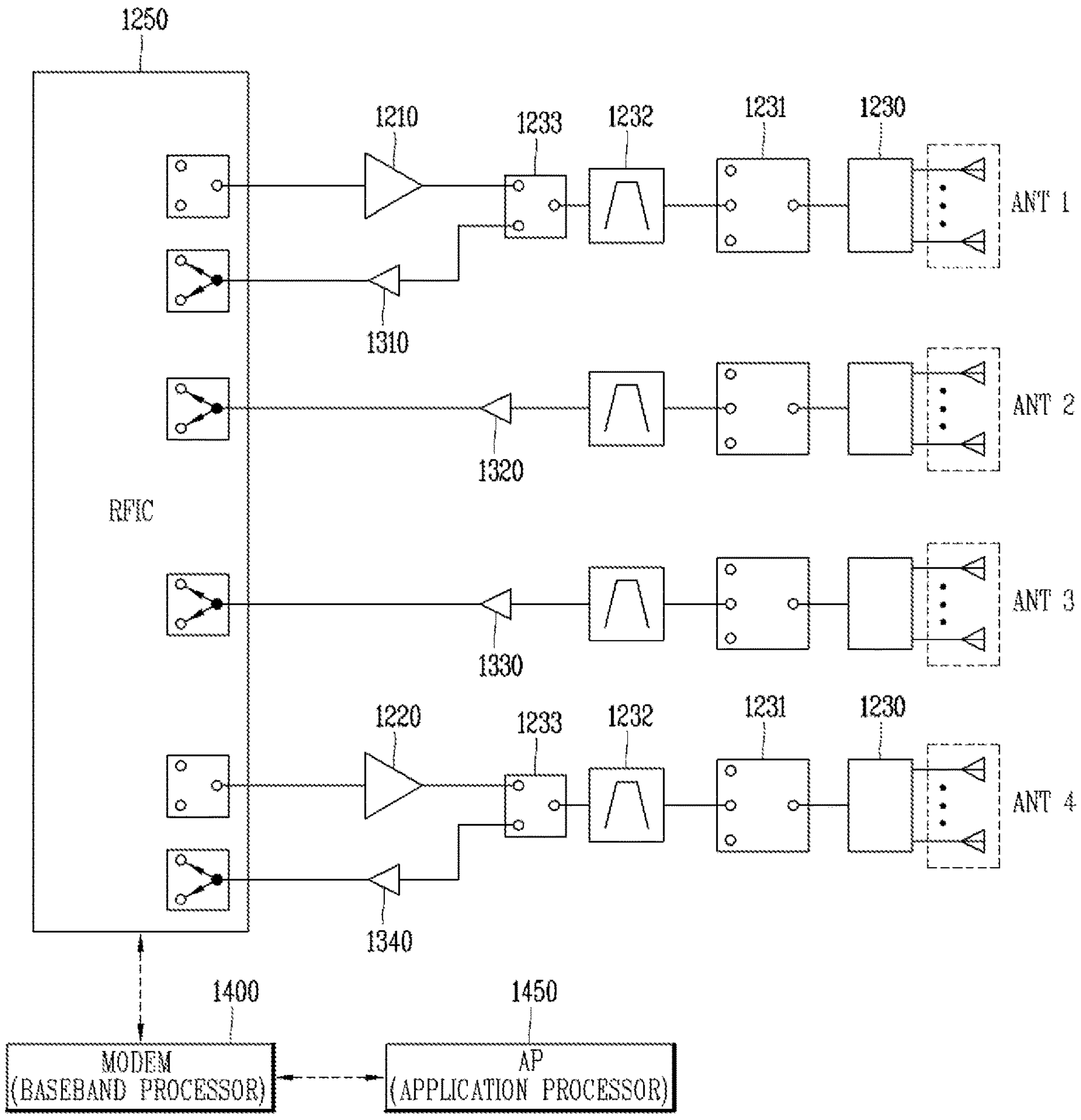
FIG. 3B is a diagram illustrating a configuration of a wireless communication module of an electronic device operable in a plurality of wireless communication systems according to an implementation.

FIG. 3B is a diagram illustrating a configuration of a wireless communication module of an electronic device operable in a plurality of wireless communication systems according to an implementation. Referring to FIG. 3B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 3B, the RFIC 1250 may be configured as a 4G/5G integrated type, but the present disclosure may not be limited thereto. The RFIC 250 may be configured as a 4G/5G separate type according to an application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. As such, when the RFIC 1250 is configured as the 4G/5G separate type, there may be an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 500 may control the modem 1400 and the RFIC 1250 to receive data through both the 4G base station and 5G base station.

Meanwhile, in a multi-transceiving system of FIG. 3B, a transmitter and a receiver of each radio system may be integrated into a single transceiver. Accordingly, a circuit portion for integrating two types of system signals may be removed from an RF front-end.

In addition, since the front-end component can be controlled by the integrated transceiver, the front-end component can be more efficiently integrated than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in the millimeter wave (mmWave) band, one of the first and second power amplifiers 1210 and 1220 may operate in the 4G band and the other may operate in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 1210 and 1220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device capable of operating in a plurality of wireless communication systems according to an implementation may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as an array antenna ANT1 to ANT4 including a plurality of antenna elements. Specifically, the phase controller 1230 may control a phase of a signal applied to each antenna element of each of the array antennas ANT1 to ANT4. Specifically, the phase controller 1230 may control both magnitude and phase of a signal applied to each antenna element of each of the array antennas ANT1 to ANT4. Since the phase controller 1230 controls both the magnitude and the phase of the signal, it may be referred to as a power and phase controller 230.

Therefore, by controlling the phase of the signal applied to each antenna element of each of the array antennas ANT1 to ANT4, beam-forming can be independently performed through each of the array antennas ANT1 to ANT4. In this regard, multi-input/multi-output (MIMO) may be performed through each of the array antennas ANT1 to ANT4. In this case, the phase controller 230 may control the phase of the signal applied to each antenna element so that each of the array antennas ANT1 to ANT4 can form beams in different directions.

The duplexer 1231 may be configured to separate signals into a signal in a transmission band and a signal in a reception band. In this case, the signals in the transmission band that are transmitted through the first and second power amplifiers 1210 and 1220 are applied to the first and fourth antennas ANT1 and ANT4, respectively, through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to allow a signal in the transmission band or the reception band to pass through and to block a signal in a band other than the transmission band and the reception band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an implementation of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

Meanwhile, in another implementation of the present disclosure, the switch 1233 may also be applied to a frequency division multiplex (FDD) scheme. In this case, the switch 1233 may be configured in a form of a double-pole double-throw (DPDT) to connect or block the transmission signal and the reception signal, respectively. On the other hand, since the transmission signal and the reception signal can be separated by the duplexer 1231, the switch 1233 may not be necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. The RFIC 1250 and the modem 1400 may be implemented as physically separated circuits. Alternatively, the RFIC 1250 and the modem 1400 may be logically or functionally distinguished from each other on one physical circuit.

The modem 1400 may perform control and signal processing for signal transmission and reception through different communication systems using the RFID 1250. The modem 1400 may acquire control information from the 4G base station and/or the 5G base station. Here, the control information may be received through a physical downlink control channel (PDCCH), but may not be limited thereto.

The modem 1400 may control the RFIC 1250 to transmit and/or receive signals through the first communication system and/or the second communication system at a specific time and frequency resources. Accordingly, the RFIC 1250 may control transmission circuits including the first and second power amplifiers 1210 and 1220 to transmit a 4G signal or a 5G signal in the specific time interval. In addition, the RFIC 1250 may control reception circuits including the first to fourth low noise amplifiers 1310 to 1340 to receive a 4G signal or a 5G signal at a specific time interval.

Hereinafter, an electronic device having an array antenna that can operate in millimeter wave bands according to the present disclosure will be described. Specifically, an electronic device having a plurality of array antennas in the form of transparent antennas embedded in a display will be described.

Figure 4A:
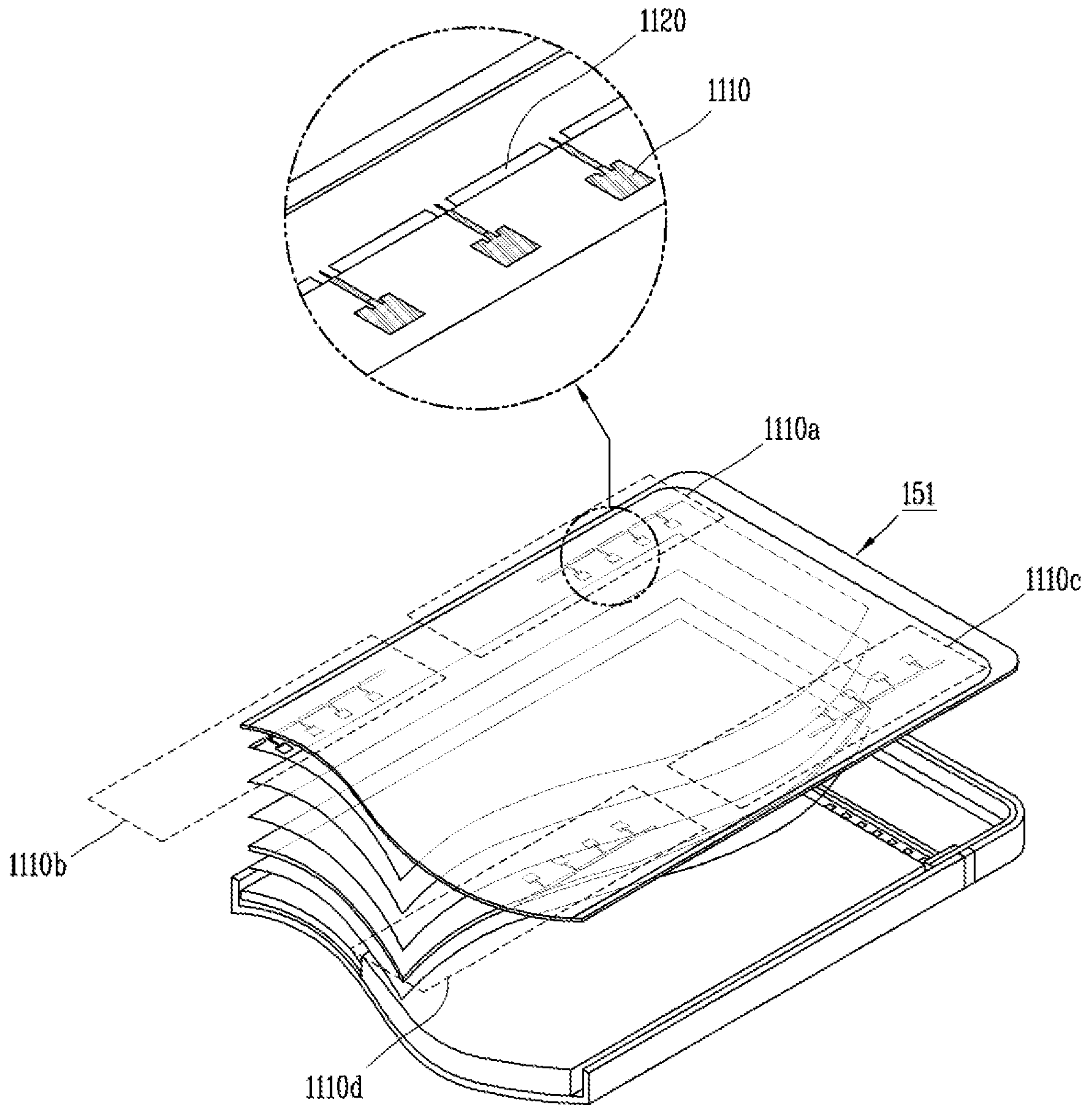
FIG. 4A shows an electronic device having a transparent embedded in a display and a transmission line according to the present disclosure.
Figure 4B:
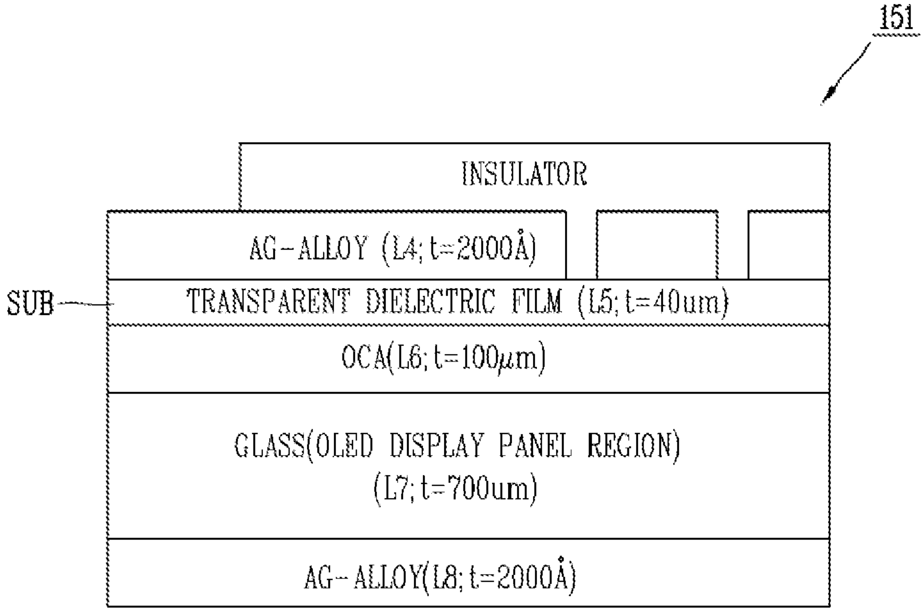
FIG. 4B shows a structure of a display with a transparent antenna embedded therein according to the present disclosure.

In relation to this, FIG. 4A shows an electronic device having a transparent embedded in a display and a transmission line according to the present disclosure. Also, FIG. 4B shows a structure of a display with a transparent antenna embedded therein according to the present disclosure.

Referring to FIG. 4A, the electronic device may include an antenna 1100 embedded in a display 151 and a transmission line 1120 configured to feed power to the antenna 1100. Here, the display 151 may be configured as an OLED or LCD. In some examples, referring to FIGS. 3 and 4A, the electronic device may include a plurality of antennas ANT1 to ANT4 disposed in the display 151, and a transmission line 1120 to feed the antennas ANT1 to ANT4. Here, each of the plurality of antennas ANT1 to ANT4 may be implemented as an array antenna to perform beamforming. In some examples, array antennas of each of the plurality of antennas 1110*a* to 1110*d* may be spaced apart from one another to perform MIMO. In this regard, spatial beamforming may be performed so that respective beam directions by the plurality of antennas ANT1 to ANT4 are substantially orthogonal to one another.

In this regard, the antenna elements of each of the plurality of array antennas ANT1 to ANT4 may be formed as metal meshes disposed in one direction to improve visibility. In this regard, a metal mesh line formed in an oblique direction of a specific angle may be disposed inside each antenna element of each of the plurality of array antennas ANT1 to ANT4. However, the present disclosure may not be limited thereto, and a metal mesh line formed in a horizontal direction or a vertical direction may be disposed inside each antenna element.

In this regard, four antenna elements may implement one array antenna as illustrated in FIG. 4A. However, the present disclosure may not be limited thereto, and the array antenna may be implemented as a 2×1, 4×1, or 8×1 array antenna. Also, beamforming may be performed not only in one axial direction, for example, a horizontal direction, but also in another axial direction, for example, a vertical direction. To this end, the array antenna may change to a 2×2, 4×2, 4×4, or 2×4 array antenna. Beamforming can be performed in the mmWave bands using such array antennas.

In some examples, in the electronic device having the transparent antenna, the transparent antenna may operate in the Sub6 band. The transparent antenna operating in the Sub6 band may not be provided in the form of the array antenna. Therefore, the transparent antenna operating in the Sub6 band may be configured such that single antennas are spaced apart from one another to perform MIMO.

Accordingly, instead of the structure in which the patch antennas of FIG. 4A are disposed in the form of an array antenna, patch antennas as single antennas may be disposed at upper left, lower left, upper right, and lower right sides of the electronic device, and each patch antenna may perform MIMO.

Hereinafter, a display structure having transparent antennas therein will be described. Referring to FIG. 4B, a dielectric layer, that is, a dielectric substrate, may be disposed on an OLED display panel and an OCA inside the display 151. Here, the dielectric 1130 in the form of a film may be used as the dielectric substrate of the antenna 1100. In addition, an antenna layer may be disposed on the dielectric 1130 in the form of the film. Here, the antenna layer may be made of alloy (Ag alloy), copper, aluminum, or the like. In some examples, the antenna 1100 and the transmission line 1120 of FIG. 4A may be disposed on the antenna layer.

In relation to this, referring to FIGS. 4A and 4B, transparent antennas according to the present disclosure may be formed by a metal mesh grid structure on the inside of patch antennas.

Meanwhile, in an electronic device as in FIGS. 1 to 2B, a concrete configuration and functions of an electronic device having an antenna disposed therein as in FIGS. 3A and 4A and a multi-transceiving system as in FIG. 3B will be described below.

In relation to this, the electronic device may be configured to provide 5G communication service in various frequency bands. Recently, attempts are being made to provide 5G communication service by using Sub6 bands of 6 GHz or less. To support a plurality of communication systems, the electronic device needs to operate in both an LTE band and a 5G Sub6 band.

In order to provide 4G LTE communication service and 5G communication service, an antenna may be disposed inside an electronic device or inside a display. In relation to this, an antenna may be implemented without interference with existing antennas disposed inside the electronic device, by utilizing a wide space inside the display. However, such a transparent antenna provided in a display has the problem of low conductivity because it is implemented with a metal mesh grid structure or a transparent material.

In addition, it is necessary to extend the antenna bandwidth to cover up to the LTE low band. To this end, there is a problem in that the size of the antenna increases.

The present disclosure is directed to solving the aforementioned problems and other drawbacks. Another aspect is to provide an antenna of a transparent material that operates in a 4G LTE band and a 5G Sub6 band.

Another aspect of the present disclosure is to propose an antenna structure that operates as a single antenna module over a wide band that extends to 4G LTE low band and a 5G Sub6 band.

Another aspect of the present disclosure is to propose a multi-mode/multi-band antenna structure that operates as a single antenna module over a wide band that extends to 4G LTE low band and a 5G Sub6 band.

Another aspect of the present disclosure is to improve communication performance by disposing a plurality of transparent antennas on a display of an electronic device.

To accomplish these aspects, an antenna provided in an electronic device explained in the present disclosure may be disposed on a substrate. Meanwhile, the antenna may be implemented as a transparent antenna. In relation to this, a metal pattern of the antenna may be implemented as a transparent material or a metal mesh grid. The substrate where the antenna is disposed also may be implemented as a transparent material substrate.

An antenna provided in an electronic device explained in the present disclosure may need to operate in both an LTE band and a 5G Sub6 band. Specifically, the electronic device needs to operate in a wideband of about 0.69 GHz to 6 GHz. Thus, the antenna provided in the electronic device also needs to operate in a wideband of about 0.69 GHz to 6 GHz. In relation to this, FIG. 5 shows resonance characteristics of an antenna operating in a single band and a relationship between the size and frequency of an antenna operating in multiple bands.

Figure 5:
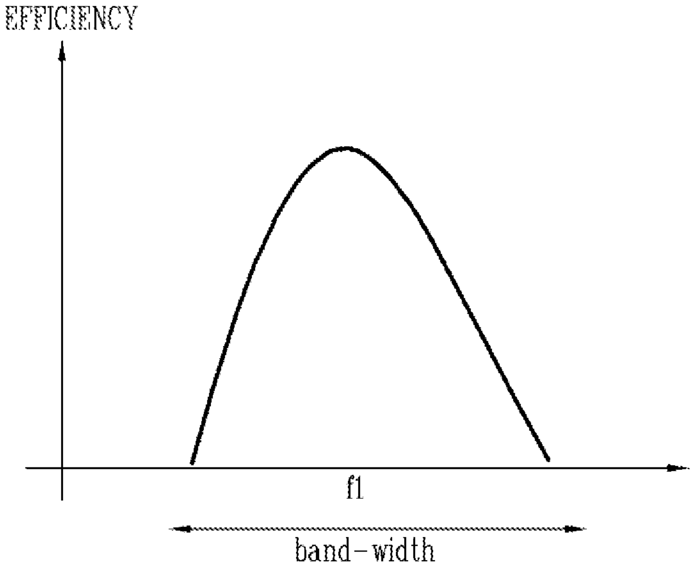
FIG. 5 shows resonance characteristics of an antenna operating in a single band and a relationship between the size and frequency of an antenna operating in multiple bands.
Figure 5:
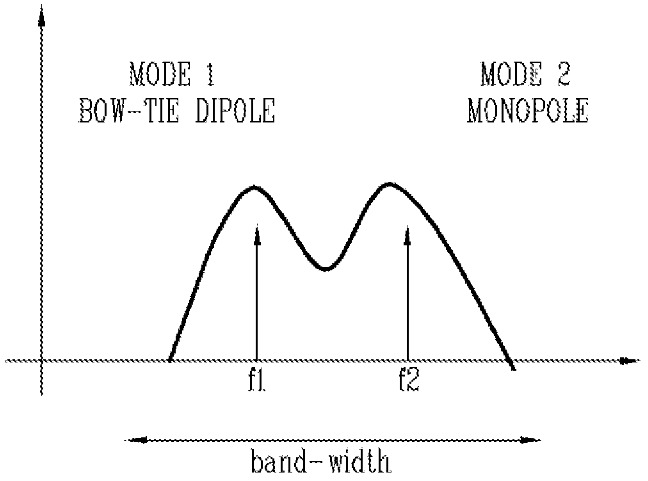

Referring to (a) of FIG. 5, an antenna of a particular size operating in a single band resonates at Frequency f1. In this case, the antenna of the particular size may operate as an antenna in a particular bandwidth BW1 including Resonant Frequency f1. Thus, the antenna operating in the single band may operate as a narrowband antenna whose bandwidth characteristics are limited.

Referring to (b) of FIG. 5, an antenna of a particular size operating in multiple bands resonates at frequencies f1 and f2. In this case, the antenna of the particular size operating in the multiple bands may operate as an antenna in a specific bandwidth BW2 including resonant frequencies f1 and f2. Thus, the antenna of the particular size operating in the multiple bands may operate as a wideband antenna whose bandwidth characteristics are improved.

According to the present disclosure, an antenna may be designed in a multi-radiation structure in which radiation occurs independently at different frequencies to design an antenna that satisfies wideband characteristics with a limited antenna size. In relation to this, when radiators of dependent modes are located close to one another, a decline in efficiency may occur at both of the frequencies f1 and f2, or antenna matching characteristics may deteriorate. Accordingly, a multi-mode antenna structure is proposed in which antennas explained in the present disclosure operate independently from one another.

For example, a multi-mode antenna operating in a first mode and a second mode may be configured to resonate at frequencies f1 and f2. A multi-band antenna may be referred to as a multi-mode antenna since it operates in multiple bands in multiple modes. More specifically, a multi-band/multi-mode antenna proposed in the present disclosure may be configured as a combination of a bow-tie antenna and a monopole antenna.

Such a multi-band/multi-mode antenna may be implemented as a metal pattern printed on a substrate. In relation to this, FIGS. 6 and 7 show multi-band/multi-mode antenna configurations according to different embodiments, respectively.

Figure 6:
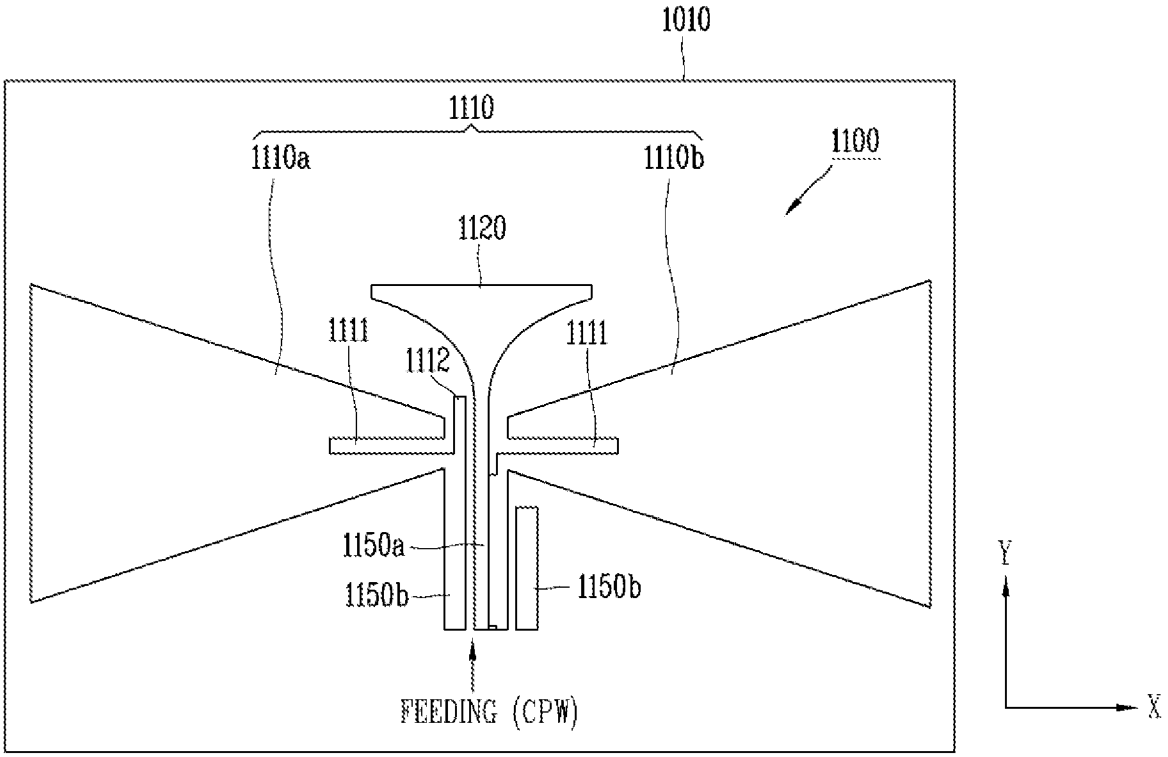
FIGS. 6 and 7 show multi-band/multi-mode antenna configurations according to different embodiments, respectively.
Figure 7:
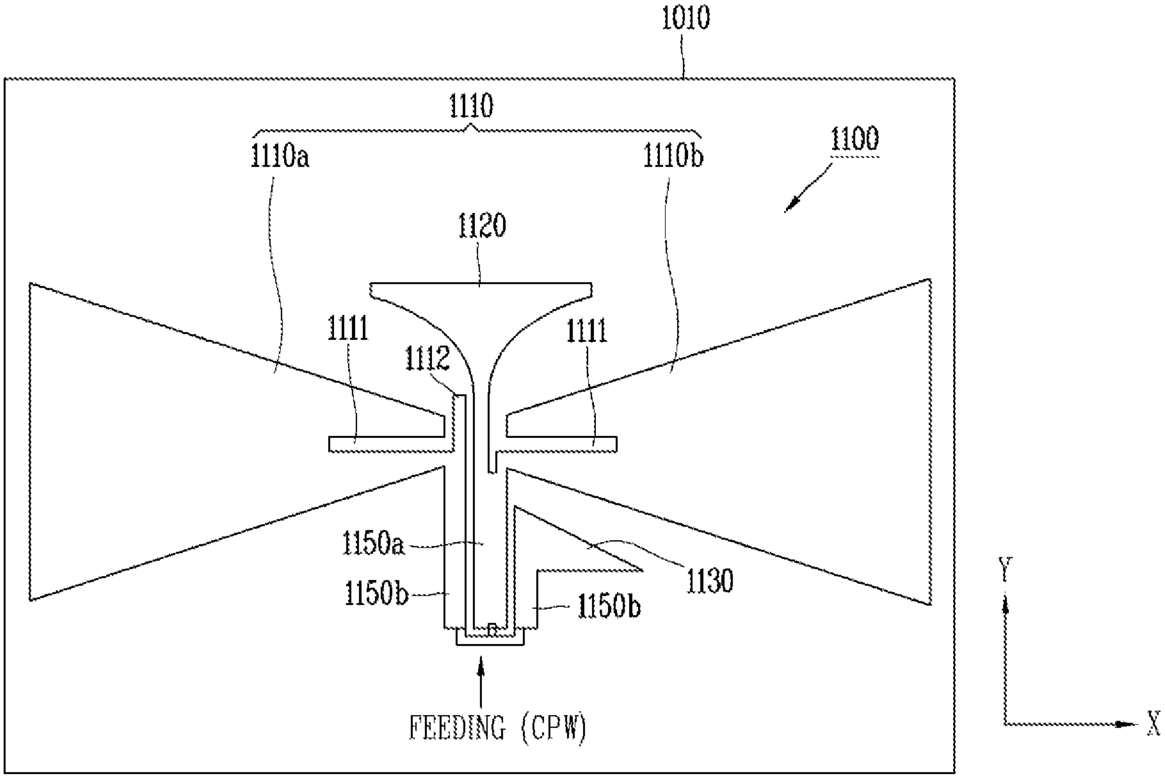

Specifically, FIG. 6 shows a multi-band/multi-mode antenna configuration including a bow-tie antenna and a monopole antenna. Meanwhile, FIG. 7 shows a multi-band/multi-mode antenna configuration including a bow-tie antenna, a monopole antenna, and a parasitic patch antenna. In relation to this, the multi-band/multi-mode antenna configuration explained in the present disclosure is not limited to the configurations of FIGS. 6 and 7, and may be variously changed according to applications. The multi-band/multi-mode antenna configuration may include a bow-tie antenna and a parasitic patch antenna. Alternatively, the multi-band/multi-mode antenna configuration may include a monopole antenna and a parasitic patch antenna. Generalizing this multi-band/multi-mode antenna configuration, it can be made of any one of all possible combinations of a plurality of radiators.

Technical characteristics of a multi-band/multi-mode antenna proposed in the present disclosure are as follows.

To perform multiple input multiple output (MIMO), an antenna structure with a small antenna size may be proposed. For example, four antennas may be disposed on an electronic device for 4×4 MIMO. To this end, an antenna structure with a small antenna size needs to be proposed.

For Global Sub 6 GHz communication service, an antenna having wideband characteristics of about 158% (0.69 GHz to 6 GHz) is required. For example, a 0.69-0.8 GHz band, a 0.9-1.4 GHz band, and a 1.4-6 GHz band may be implemented in independent radiation modes.

In relation to this, it is necessary to obtain antenna impedance characteristics for a low band of 0.69 to 1.4 GHz with a limited antenna size. For example, an antenna size required to cover an LTE low band and a 5G Sub6 band may be 300×600 mm or greater. On the other hand, a multi-mode/multi-band antenna proposed in the present disclosure may be implemented with a small size of 120×50 mm.

Meanwhile, it is not easy to cover all low bands in a single resonance mode. Thus, as shown in (b) of FIG. 5, an antenna bandwidth may be provided by an antenna resonating in two radiation modes orthogonal to each other at neighboring frequencies. In relation to this, an antenna may be implemented in a bow-tie dipole mode where the antenna has a wideband dipole structure for a band of 0.69 to 0.85 GHz. Meanwhile, an antenna may be implemented in a monopole mode with electrical characteristics by which the antenna is orthogonal to a dipole for a band of 0.9 to 1.4 GHz. Meanwhile, in the present disclosure, an antenna bandwidth of 1.7 to 6 GHz may be provided by using an additional triangle patch and a higher mode of dipoles/monopoles.

Meanwhile, an end-fire radiation structure using traveling waves may be applied for a wideband antenna structure. However, in the present disclosure, an isotropic radiation pattern may be formed through an omni-directional radiation structure using standing waves. Accordingly, wideband antenna characteristics and omni-directional signal transmission/reception are possible through the monopole+bow-tie dipole antenna structure proposed in the present disclosure.

Referring to FIG. 6, an electronic device may include an antenna 1100 and a feeding unit 1150. The antenna 1100 may be disposed on a substrate 1010 disposed inside the electronic device, and operate to resonate in a plurality of frequency bands. The feeding unit 1150 may be disposed on the substrate 1010, and may be composed of a feeding line **1150*a* feeding a signal to the antenna 1100 and ground lines 1150*b* operating as a ground. For example, the feeding unit 1150 may be formed of a structure in which the ground lines 1150*b* are spaced apart at both sides of the feeding line 1150*a* at a predetermined interval. That is, the feeding unit 1150** may be formed of, but not limited to, a co-planar waveguide structure. Meanwhile, a feeding structure for antenna impedance matching proposed in the present disclosure does not require such a structure as a wideband balun. Thus, a wideband antenna may be provided in such a way as to be printed on a substrate without an increase in volume caused by the introduction of the wideband balun.

The antenna 1100 may include one or more radiators. The antenna 1100 may include a first radiator 1110 and a second radiator 1120. The first radiator 1110 may include a first metal pattern **1110*a* and a second metal pattern 1110*b*. Specifically, the first radiator 1110 may include a first metal pattern 110*a* connected to the feeding line 1150*a* and a second metal pattern 1110*b* connected to the ground lines 1150*b*. The first metal pattern 1110*a* and the second metal pattern 1110*b* may be formed in a first axial direction of the substrate 1010. For example, the first metal pattern 1110*a* and the second metal pattern 1110*b* may be formed in a horizontal direction, e.g., x-axis direction, of the substrate 1010**.

In the second radiator 1120, a third metal pattern connected to the feeding line **1150*a* may be formed in a second axial direction of the substrate 1010. For example, the third metal pattern may be formed in a vertical axis direction, e.g., y-axis direction, of the substrate 1010**.

The first radiator 1110 may be implemented in the shape of a dipole or a bow tie. For example, the first radiator 1110 may be, but not limited to, a bow-tie antenna which is formed in such a way that the width of the first metal pattern **1110*a* and the second metal pattern 1110*b* increases at a predetermined angle. Accordingly, the first radiator 1110 may be an antenna that is implemented in a certain metal pattern formed in the first axial direction. In this case, if the operating band of the first radiator 1110 is a first frequency band, the electrical length of the first radiator 1110 may be set to about half the wavelength of the operating band. Thus, the first radiator 1110 may be referred to as a dipole antenna. If the first radiator 1110** is formed in such a way that its width increases at a predetermined angle, it may be referred to as a bow-tie antenna.

Figure 8:
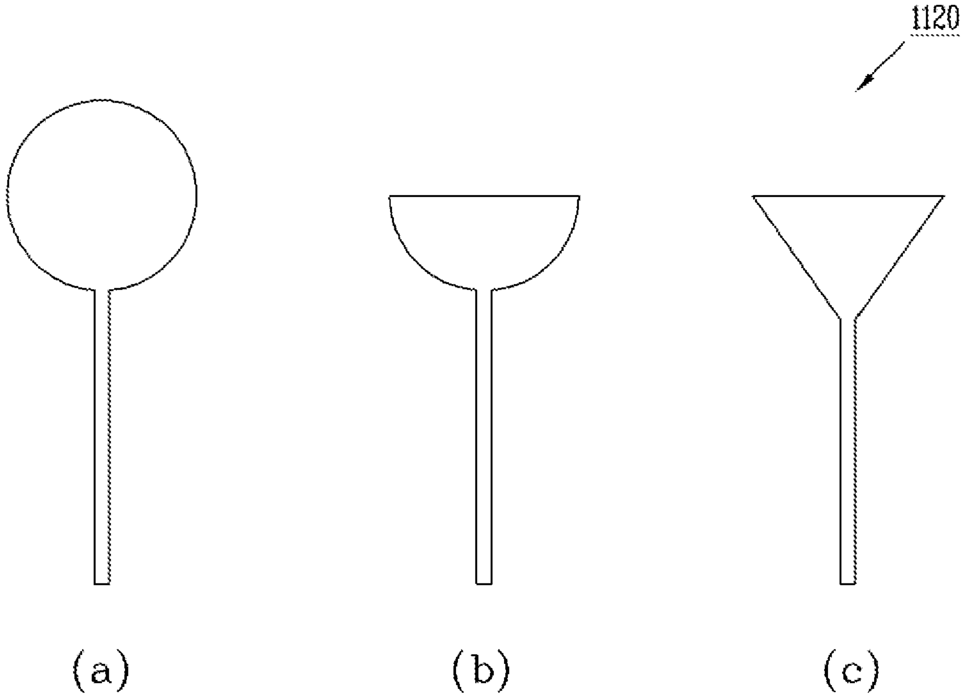
FIG. 8 shows different shapes of a monopole antenna according to various embodiments.

The second radiator 1110 may be implemented in the form of a monopole. More specifically, a monopole antenna, which is the second radiator 1120, may be implemented in various shapes. In relation to this, FIG. 8 shows different shapes of a monopole antenna according to various embodiments. Referring to FIGS. 6 to 8, an end portion of the monopole antenna may be formed of at least one of a circular structure, a semi-circular structure, a triangular structure, and a tapered structure. Thus, the monopole antenna may be configured as a loaded monopole antenna whose end portion is formed of at least one of a circular structure, a semi-circular structure, a triangular structure, and a tapered structure.

Referring to FIG. 8, an end portion of the second radiator 1120 may be formed of a tapered structure, a circular structure, or a semi-circular structure. If the end portion of the second radiator 1120 has a tapered structure, the edge of a metal pattern at the end portion may be concaved. On the other hand, if the end portion of the second radiator 1120 has a circular structure or a semi-circular structure, the edge of a metal pattern at the end portion may be convexed. The antenna characteristics at different frequencies may be optimized by making the shape of the end portion of the second radiator 1110 in a complementary fashion. In relation to this, the second radiator 1120 of each antenna is made to vary in shape by disposing a plurality of antennas 1100 for multiple input and multiple output (MIMO), thereby optimizing the antenna characteristics at different frequencies. Such antenna characteristic optimization will be described in detail below.

Referring to FIG. 6, the antenna 1100 may operate to resonate in a first frequency band by the first radiator 1110. The antenna 1100 may operate to resonate in a second frequency band higher than the first frequency band by the second radiator 1120. In relation to this, the first frequency band and the second frequency band may be a low band LB among LTE bands, but is not limited thereto. For example, the first frequency band may be, but not limited to, a band of about 0.69 to 0.85 GHz. The second frequency band may be, but not limited to, a band of about 0.9 to 1.4 GHz.

The antenna 1100 may operate in a first mode so to resonate in the first frequency band. For example, the antenna 1100 may operate in a bow-tie dipole mode so as to resonate in a band of about 0.69 to 0.85 GHz. The antenna 1100 may operate in a second mode so as to resonate in the second frequency band. For example, the antenna 1100 may operate in a monopole mode so as to resonate in a band of about 0.9 to 1.4 GHz.

Meanwhile, the first metal pattern **1110*a* and second metal pattern 1110*b* of the first radiator 1110 may have a slit 1111 of a predetermined length and width. That is, the first metal pattern 1110*a* and second metal pattern 1110*b* of a bow-tie antenna may have a slit 1111** of a predetermined length and width.

As described above, the feeding unit 1150 may be formed of a structure in which the ground lines **1150*b* are spaced apart from each other by a predetermined distance on opposite sides of the feeding line 1150*a*. That is, the feeding unit 1150 may be formed of, but not limited to, a co-planar waveguide structure. Meanwhile, the first metal pattern 1110*a* of the first radiator 1110 may further include a matching stub pattern 1112 formed perpendicular to the slit 1111. In relation to this, the width of the matching stub pattern 1112 may be smaller than the width of the feeding line 1150*a*. In this case, the matching stub pattern 1112 may perform an impedance matching function with the feeding line 1150*a* and the first radiator 1110. Also, the matching stub pattern 1112 may perform an impedance matching function with the feeding line 1150*a* and the second radiator 1120**.

The matching stub pattern 1112 may be disposed only in an area in which either the first metal pattern **1110*a* or the second metal pattern 1110*b* is disposed. Thus, a transmission line 1160 adjacent to the matching stub pattern 1112 may include an asymmetric ground structure where a ground is disposed only on one side. In relation to this, at least part of a vertical electric field component formed in the feeding unit 1150 may be converted into a horizontal electric field component through the transmission line 1160 area. In this case, the vertical electric field component is an electric field component that is formed in a height direction of the substrate 1010, and the horizontal electric field component is an electric field component that is formed in a direction parallel to the substrate 1010. Accordingly, the matching stub pattern 1112** functions to improve the radiation efficiency of the antenna, as well as performing an impedance matching function for a plurality of radiators.

In the above, an antenna module operating as a dipole mode and a monopole mode has been described. Now, a structure in which a parasitic patch antenna is added to an antenna module operating as a dipole mode and a monopole mode will be described. Referring to FIG. 7, the electronic device may include an antenna 1100 and a feeding unit 1150. The feeding unit 1150 may be disposed on the substrate 1010, and may be composed of a feeding line **1150*a* for feeding a signal to the antenna 1100 and ground lines 1150*b* operating as a ground. For example, the feeding unit 1150 may be formed of a structure in which the ground lines 1150*b* are spaced apart from each other by a predetermined distance on opposite sides of the feeding line 1150*a*. That is, the feeding unit 1150** may be formed of, but not limited to, a co-planar waveguide structure.

The antenna 1100 may include one or more radiators. The antenna 1100 may include a first radiator 1110, a second radiator 1120, and a third radiator 1130. The first radiator 1110 may include a first metal pattern **1110*a* connected to a feeding line 1150*a* and a second metal pattern 1110*b* connected to the ground lines 1150*b*. The first metal pattern 1110*a* and the second metal pattern 1110*b* may be formed in a first axial direction of the substrate 1010. For example, the first metal pattern 1110*a* and the second metal pattern 1110*b* may be formed in a horizontal direction, e.g., x-axis direction, of the substrate 1010**.

In the second radiator 1120, a third metal pattern connected to the feeding line **1150*a* may be formed in a second axial direction of the substrate 1010. For example, the third metal pattern may be formed in a vertical axis direction, e.g., y-axis direction, of the substrate 1010**.

The third radiator 1130 may be formed of a fourth metal pattern spaced a predetermined distance apart from one of the ground lines **1150*b***.

The first radiator 1110 may be implemented in the shape of a dipole or a bow tie. For example, the first radiator 1110 may be, but not limited to, a bow-tie antenna, which is formed in such a way that the width of the first metal pattern 1110*a* and the second metal pattern 1110*b* increases at a predetermined angle. Accordingly, the first radiator 1110 may be an antenna that is implemented in a certain metal pattern formed in the first axial direction. In this case, if the operating band of the first radiator 1110 is a first frequency band, the electrical length of the first radiator 1110 may be set to about half the wavelength of the operating band. Thus, the first radiator 1110 may be referred to as a dipole antenna. If the first radiator 1110 is formed in such a way that its width increases at a predetermined angle, it may be referred to as a bow-tie antenna.

The second radiator 1110 may be implemented in the form of a monopole. More specifically, a monopole antenna, which is the second radiator 1120, may be implemented in various shapes. In relation to this, FIG. 8 shows different shapes of a monopole antenna according to various embodiments. Referring to FIGS. 6 to 8, an end portion of the monopole antenna may be formed of at least one of a circular structure, a semi-circular structure, a triangular structure, and a tapered structure. Thus, the monopole antenna may be configured as a loaded monopole antenna whose end portion is formed of at least one of a circular structure, a semi-circular structure, a triangular structure, and a tapered structure.

The third radiator 1130 may be formed in, but not limited to, a triangular shape. As another example, the edge of the third radiator 1130 may be formed in a curved shape, as well as a linear shape. The edge of the third radiator 1130 may have a tapered concave or convex shape. The third radiator 1130 may be formed of a parasitic metal pattern, and may resonate in a third frequency band higher than the second frequency band. Here, the third frequency band may be a mid band MB and a high band HB among LTE bands, but is not limited thereto.

Referring to FIG. 8, the antenna 1100 may operate to resonate in a first frequency band by the first radiator 1110. The antenna 1100 may operate to resonate in a second frequency band higher than the first frequency band by the second radiator 1120. Also, the antenna 1100 may operate to resonate in the third frequency band higher than the second frequency band by the third radiator 1130.

In relation to this, the first frequency band and the second frequency band may be a low band LB among LTE bands, but is not limited thereto. For example, the first frequency band may be, but not limited to, a band of about 0.69 to 0.85 GHz. The second frequency band may be, but not limited to, a band of about 0.9 to 1.4 GHz. Also, the third frequency band may be a mid band MB and a high band HB among LTE bands, but is not limited thereto. The third frequency band may be, but not limited to, a band of about 1.7 to 4.5 GHz.

The antenna 1100 may operate in a first mode so to resonate in the first frequency band. For example, the antenna 1100 may operate in a bow-tie dipole mode so as to resonate in a band of about 0.69 to 0.85 GHz. In relation to this, both the first metal pattern 1110*a* and the second metal pattern 1110*b* may have a slit 1111 to miniaturize the bow-tie antenna. Depending on applications, the slit 1111 may be formed in only either the first metal pattern 1110*a* or the second metal pattern 1110*b*. For example, the slit 1111 may be formed in the first metal pattern 1110*a*, and may perform an impedance matching function at the corresponding frequencies, along with a matching stub pattern 1112.

The antenna 1100 may operate in a second mode so as to resonate in the second frequency band. For example, the antenna 1100 may operate in a mono-pole mode so as to resonate in a band of about 0.9 to 1.4 GHz. In relation to this, the second radiator 1120 may be formed of a loaded mono-pole structure to increase the bandwidth of the mono-pole antenna and miniaturize the mono-pole antenna.

Also, the antenna 1100 may operate in a third mode so as to resonate in the third frequency band. For example, the antenna 1100 may operate in a third mode by a parasitic patch so as to resonate in a band of about 1.7 to 4.5 GHz. In relation to this, the third radiator 1130 may be formed of a parasitic metal pattern having a triangular shape on a ground line 1150*b* of the feeding unit 1150 so that the third radiator 1130 resonates in LTE MB/HB bands.

Meanwhile, the antenna 1100 operating in multiple modes explained in the present disclosure also may operate as a harmonic mode antenna operating in a higher order mode. In relation to this, the antenna 1100 may operate to resonate in a fourth frequency band higher than the first frequency band and the third frequency band by the first radiator 1110. In this case, the fourth frequency band may be a band of about 4.5 to 6.0 GHz. The first radiator 1110 may operate to resonate in a fourth frequency band in the higher order mode of a bow-tie antenna corresponding to the first radiator 1110. Meanwhile, the bow-tie antenna may operate as an antenna in the fourth frequency band, and also may operate as an antenna in the fourth frequency band by the slit 1111 formed in the bow-tie antenna. Accordingly, a decrease in efficiency may be compensated for by radiation caused by the slit 1111 since the bow-tie antenna operates in the higher order mode.

Moreover, the antenna 1100 may operate to resonate in the second frequency band and the fourth frequency band by the second radiator 1120. The second radiator 1120 may operate to resonate in the fourth frequency band in the higher order mode of a monopole antenna corresponding to the second radiator 1120.

Figure 9A:
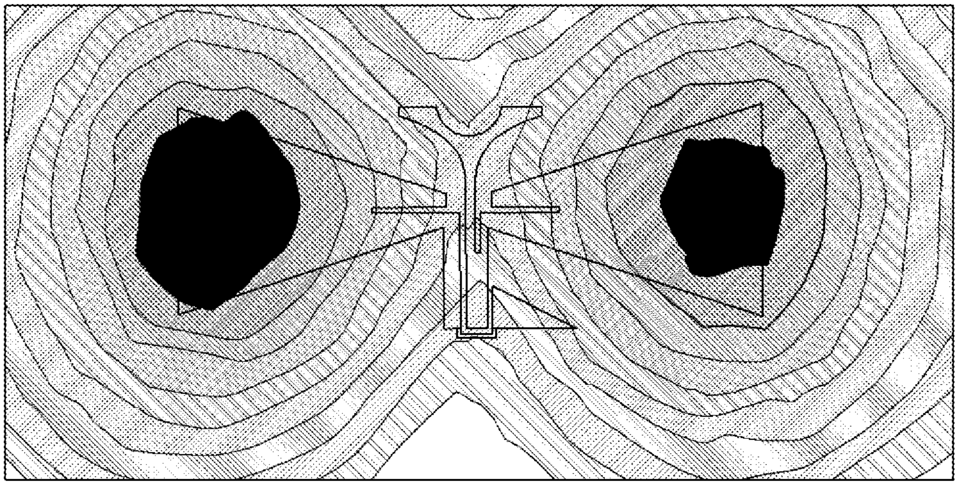
FIGS. 9A to 9C show a current distribution formed on a metal pattern of a substrate in different frequency bands. Meanwhile.
Figure 9B:
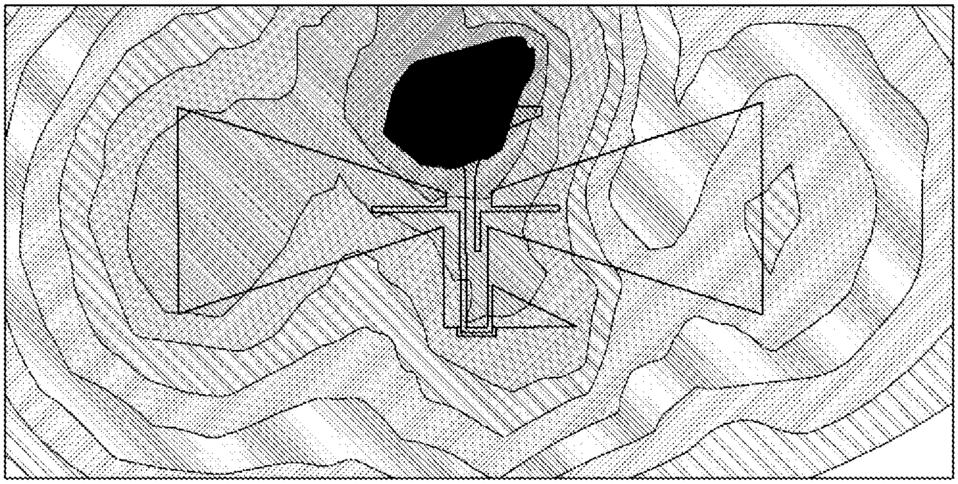
Figure 9C:
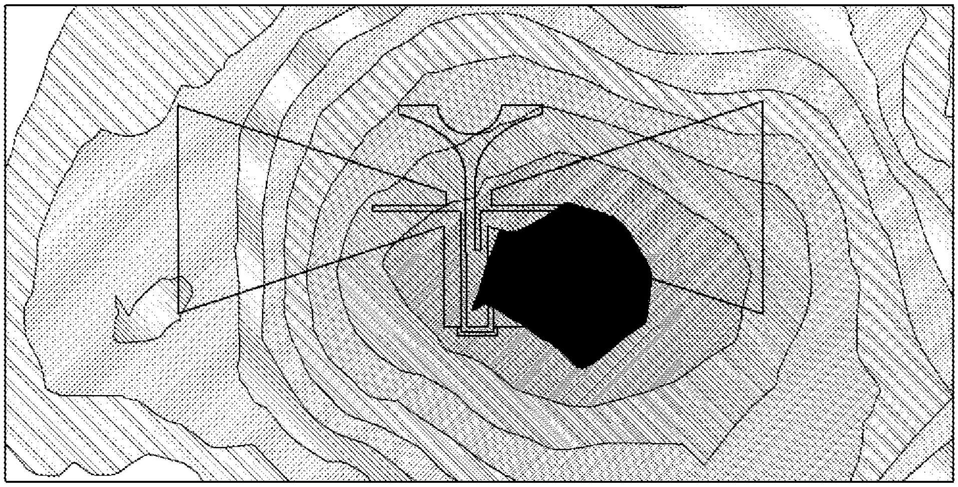
Figure 10A:
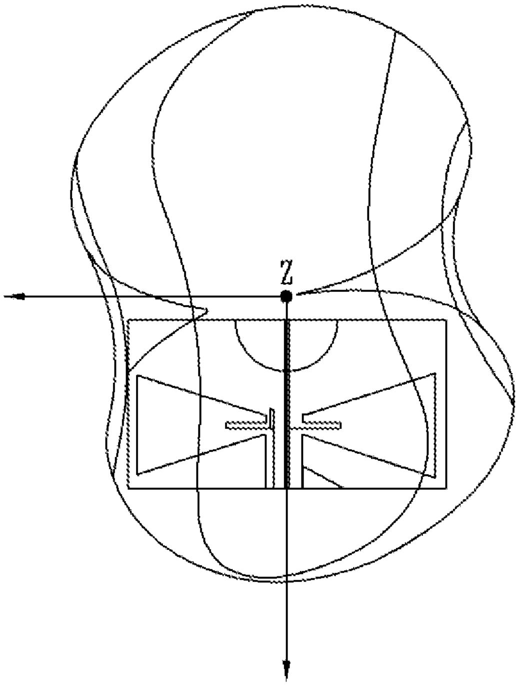
FIGS. 10A and 10B show antenna radiation patterns in different frequency bands.
Figure 10B:
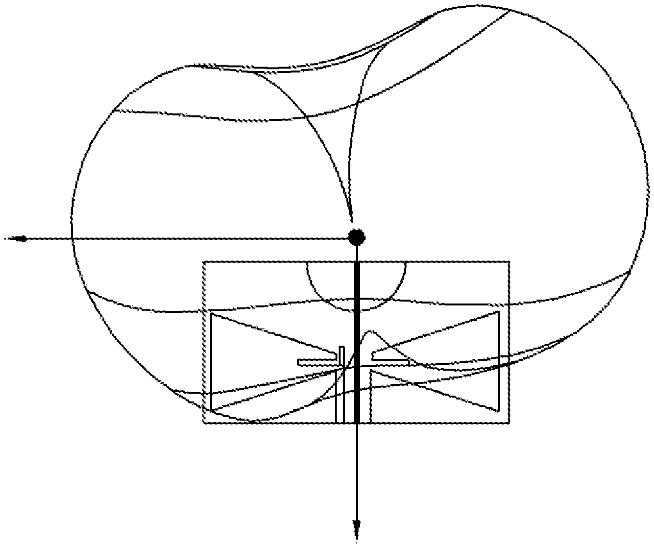

Such a multi-mode antenna operating in multiple modes may be configured to perform multiple resonances in different frequency bands. Also, the multi-mode antenna may be configured to radiate signals to different radiator regions in different frequency bands. In relation to this, FIGS. 9A to 9C show a current distribution formed on a metal pattern of a substrate in different frequency bands. Meanwhile, FIGS. 10A and 10B show antenna radiation patterns in different frequency bands.

Referring to FIGS. 7 and 9A, a current distribution is concentrated in a region corresponding to the first radiator 1110, in the first frequency band (from about 0.69 to 0.85 GHz). That is, a current density is concentrated on the first metal pattern 1110*a* and the second metal pattern 1110*b* in the first frequency band. Thus, the first radiator 1110 operates as a main radiator in the first frequency band. FIG. 10A shows an antenna radiation pattern in the first frequency band (from about 0.69 to 0.85 GHz). Referring to FIGS. 7 and 10A, the radiation pattern peaks at upper and lower portions of the substrate 1010. It can be seen that, when the antenna operates in the first frequency band, the radiation pattern is formed at a certain level or greater in almost all directions. Accordingly, when the antenna operates in the first frequency band, signals may be sent or received in almost all directions. Therefore, when the antenna operates in the first frequency band, the antenna radiation pattern may be formed of a semi-isotropic pattern.

Referring to FIGS. 7 and 9B, a current distribution is concentrated in a region corresponding to the second radiator 1120, in the second frequency band (from about 0.9 to 1.4 GHz). That is, a current density is concentrated on the third metal pattern of the second radiator 1120 in the first frequency band. Thus, the second radiator 1120 operates as a main radiator in the first frequency band. FIG. 10B shows an antenna radiation pattern in the first frequency band (from about 0.9 to 1.4 GHz). Referring to FIGS. 7 and 10B, the radiation pattern peaks at side portions of the substrate 1010. It can be seen that, when the antenna operates in the second frequency band, the radiation pattern is formed at a certain level or greater in almost all directions. Accordingly, when the antenna operates in the second frequency band, signals may be sent or received in almost all directions. Therefore, when the antenna operates in the second frequency band, the antenna radiation pattern may be formed of a semi-isotropic pattern.

Figure 11:
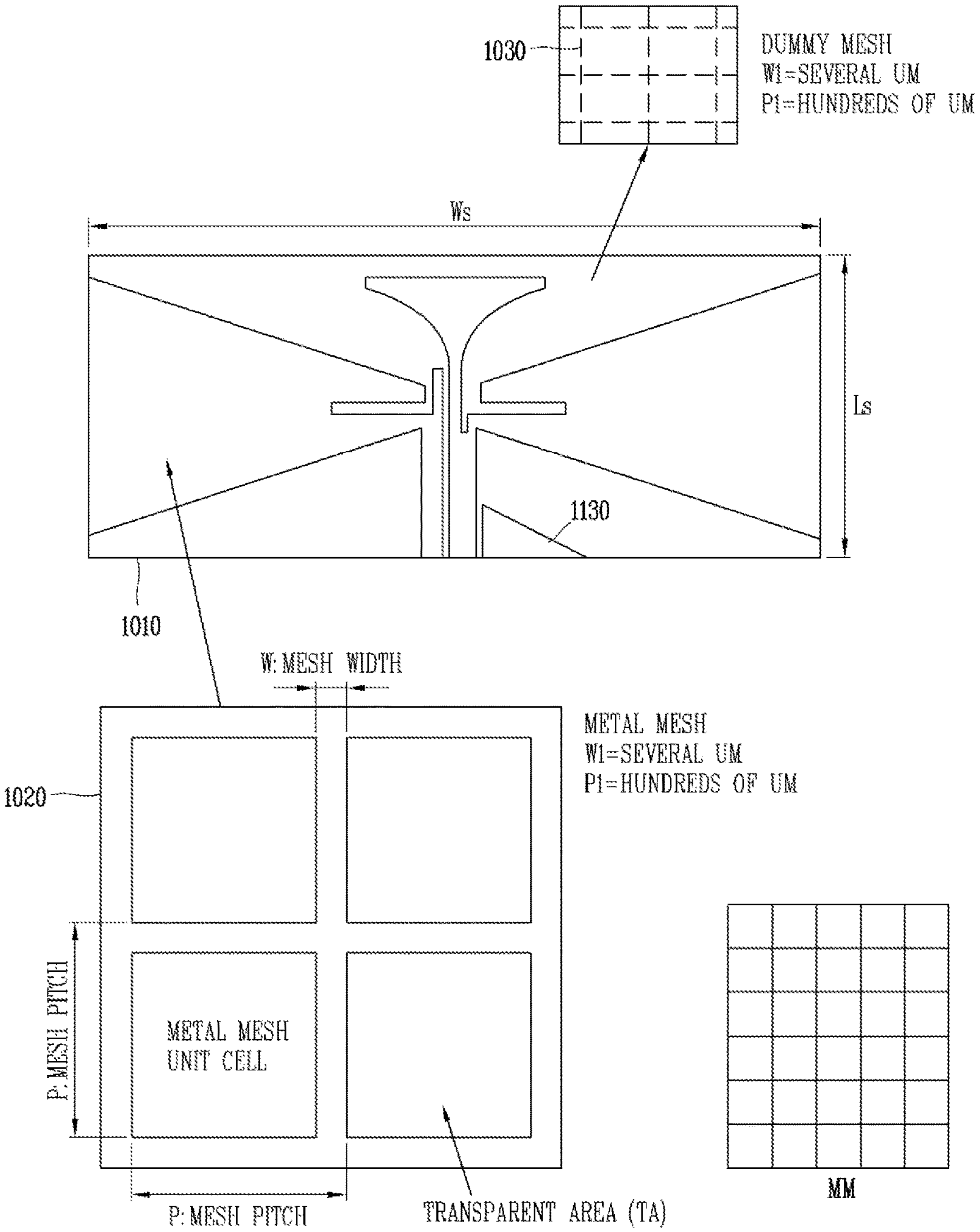
FIG. 11 shows a multi-mode/multi-band antenna configuration implemented as a transparent antenna according to an embodiment. Meanwhile.

An antenna proposed in the present disclosure may be implemented as a transparent antenna. In relation to this, FIG. 11 shows a multi-mode/multi-band antenna configuration implemented as a transparent antenna according to an embodiment. Meanwhile, FIG. 12 shows a layer structure of a transparent antenna according to one embodiment.

Figure 12:
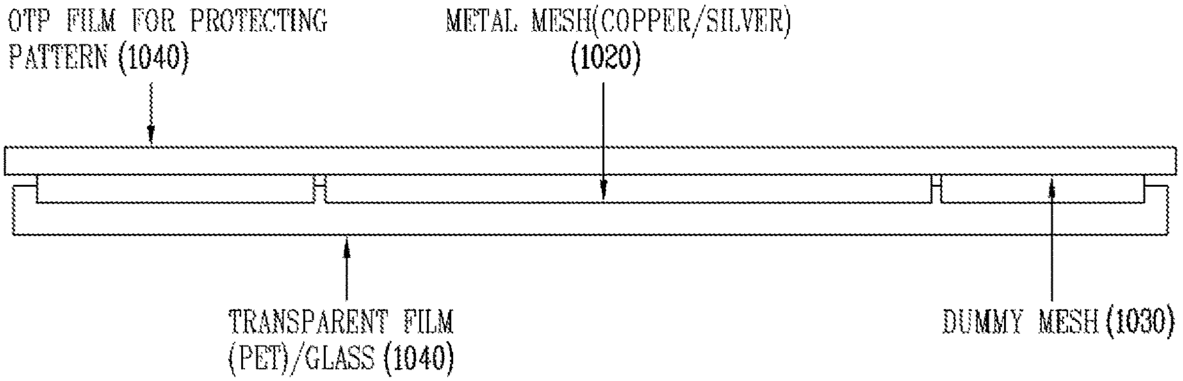
FIG. 12 shows a layer structure of a transparent antenna according to one embodiment.

Referring to FIGS. 11 and 12, a metal mesh grid 1020 and a dummy mesh grid 1030 may be disposed on a substrate 1010 of a transparent film or glass material. Meanwhile, a transparent film 1040 for protecting metal patterns from an external environment may be disposed on top of the metal mesh grid 1020 and the dummy mesh grid 1030.

To simplify the process for the transparent antenna proposed in the present disclosure, a transparent antenna including the metal mesh grid 1030 and the dummy mesh grid 1030 may be configured as a single layer. Accordingly, the transparent antenna proposed in the present disclosure may be configure as a single layer, and at the same time operate as a wideband antenna according to multiple modes.

Referring to FIGS. 11 and 12, the substrate 1010 may be implemented as a transparent material substrate. Referring to FIGS. 6, 11, and 12, the first radiator 1110 and second radiator 1120 constituting the antenna 1100 may be implemented as a transparent material metal or a metal mesh grid. Referring to FIGS. 7, 11, and 12, the first to third radiators 1110 to 1130 constituting the antenna 1100 may be implemented as a transparent metal or a metal mesh grid.

Meanwhile, in a case where a metal pattern or a metal mesh grid is disposed only in some region of the transparent substrate 1010, a visibility issue may be caused by a metal region and a dielectric region. To solve this issue, a dummy mesh grid needs to be disposed in the dielectric region of the substrate 1010 as well. The metal mesh grid disposed in the metal region of the substrate 1010 may be configured as a mesh grid of a predetermined width W. The dummy mesh grid disposed in the dielectric region of the substrate 1010 also may be configured as a mesh grid of a predetermined width W1. Also, the metal mesh grid disposed in the metal region of the substrate 1010 may be periodically disposed with a predetermined pitch P. The dummy mesh grid disposed in the dielectric region of the substrate 1010 also may be periodically disposed with a predetermined pitch P1.

In relation to this, the metal mesh grid of the antenna 1100 has to be electrically separated from the dummy mesh grid of dielectric material. Meanwhile, the width W of the metal mesh grid and the width W1 of the dummy mesh grid W1 may be equal. As another example, the width W of the metal mesh grid and the width W1 of the dummy mesh grid may be different. Also, the pitch P of the metal mesh grid and the pitch P1 of the dummy mesh grid may be equal. As another example, the pitch P of the metal mesh grid and the pitch P1 of the dummy mesh grid may be different to improve optimum antenna efficiency characteristics and/or visibility.

Figure 13A:
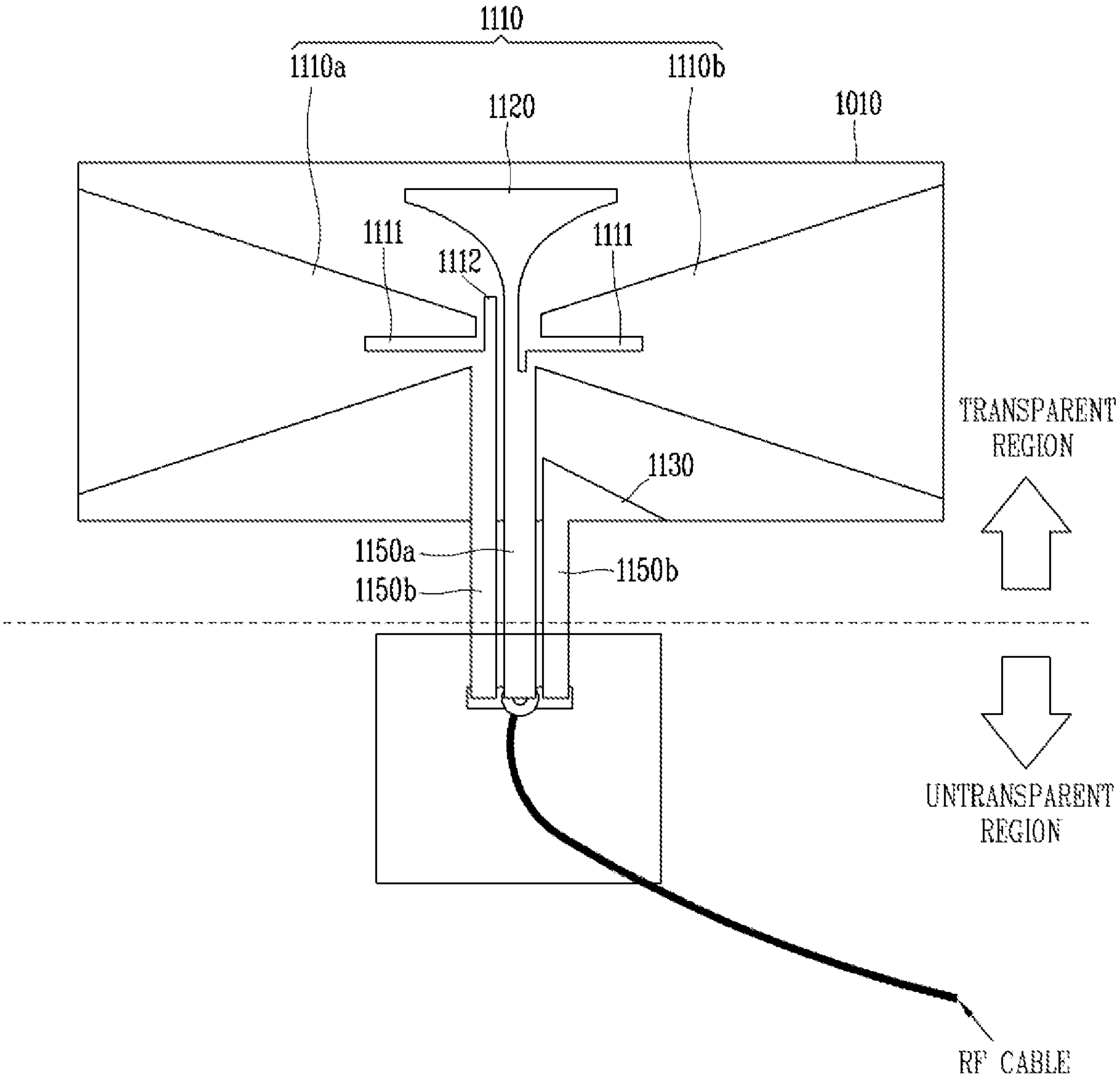
FIG. 13A shows an interface configuration with a transparent antenna according to an example.
Figure 13B:
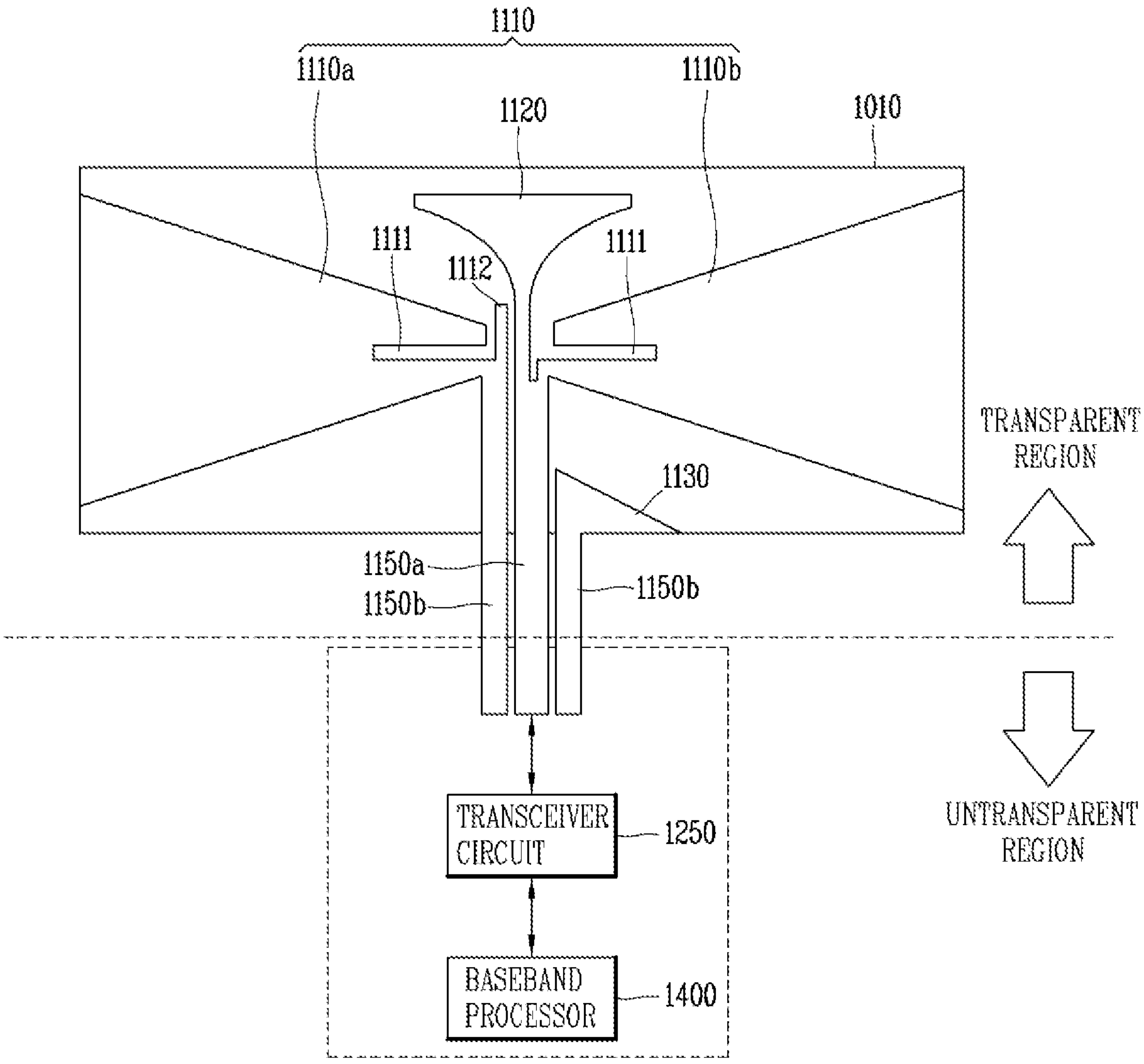
FIG. 13B shows a transparent antenna according to an example and a configuration for controlling the same.

A radiation portion proposed in the present disclosure may be implemented as a transparent material substrate and a metal mesh grid. On the other hand, part of the feeding unit of the transparent antenna may be implemented as an un-transparent region. In relation to this, FIG. 13A shows an interface configuration with a transparent antenna according to an example. FIG. 13B shows a transparent antenna according to an example and a configuration for controlling the same.

Referring to FIG. 13A, the first to third radiators 1110 to 1130 constituting the transparent antenna 1100 may be implemented as a transparent material metal or a metal mesh grid. The feeding unit 1150 may be implemented as a transparent material metal or a metal mesh grid. The feeding unit 1150 implemented in the un-transparent region may be formed of a CPW structure. The feeding unit 1150 may be connected to a transceiver circuit through an RF connector and an RF cable.

Referring to FIG. 13B, the transparent antenna 1100 may be operably coupled to a transceiver circuit 1250 for controlling the transparent antenna 1100 and a processor 1400. The processor 1400 may be, but not limited to, a baseband processor such as a modem, but may be a certain processor that controls the transceiver circuit 1250.

The transceiver circuit 1250 may be formed in the un-transparent region. Alternatively, as shown in FIG. 13A, the transceiver circuit 1250 may be interface through an RF cable and formed in other regions.

Referring to FIG. 13B, the transceiver circuit 1250 may be configured to be connected to the feeding line 1150*a* and transmit signals in a plurality of frequency bands. Referring to FIG. 3B, the transceiver circuit may further include front end modules FEM such as power amplifiers 1210 and 1220 and low-noise amplifiers 1310 to 1330.

The transceiver circuit 1250 may transmit signals to the antenna 1100 through the feeding line 1150*a* to radiate signals of a low band LB to high band HB of an LTE communication system and signals of a 5G Sub6 band through the antenna 1100. The processor 1400 may be operably coupled to the transceiver circuit 1250 and configured to control the transceiver circuit 1250.

The processor 1400 may control the transceiver circuit to perform carrier aggregation (CA) by using at least one of the first to third radiators 1110 to 1130 of the antenna 1100. In relation to this, CA may be performed through a first frequency band and a fourth frequency band by means of the first radiator 1110. CA may be performed through a second frequency band and the fourth frequency band by means of the second radiator 1120. CA may be performed through two or more of the first frequency band, the second frequency band, and the fourth frequency band by means of the first radiator 1110 and the second radiator 1120. CA may be performed through two or more of the first to fourth frequency bands by means of the first to third radiators 1110 to 1130.

Figure 14A:
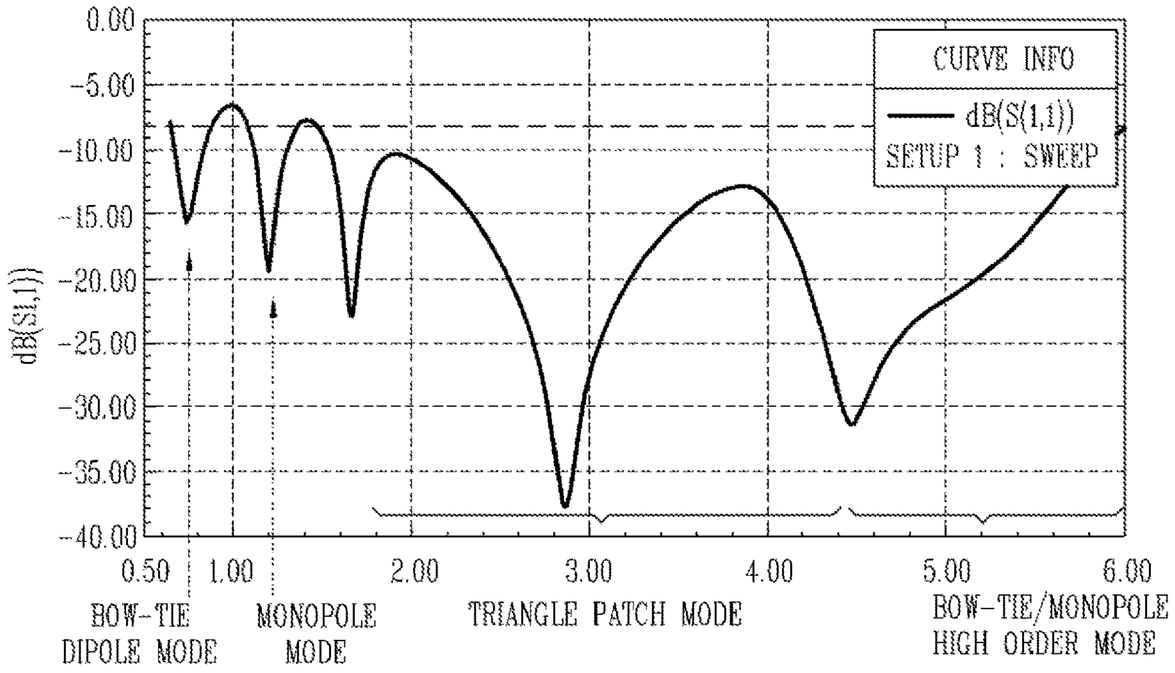
FIGS. 14A and 14B show reflection coefficient characteristics and radiation efficiency characteristics of a multi-mode antenna according to an embodiment.
Figure 14B:
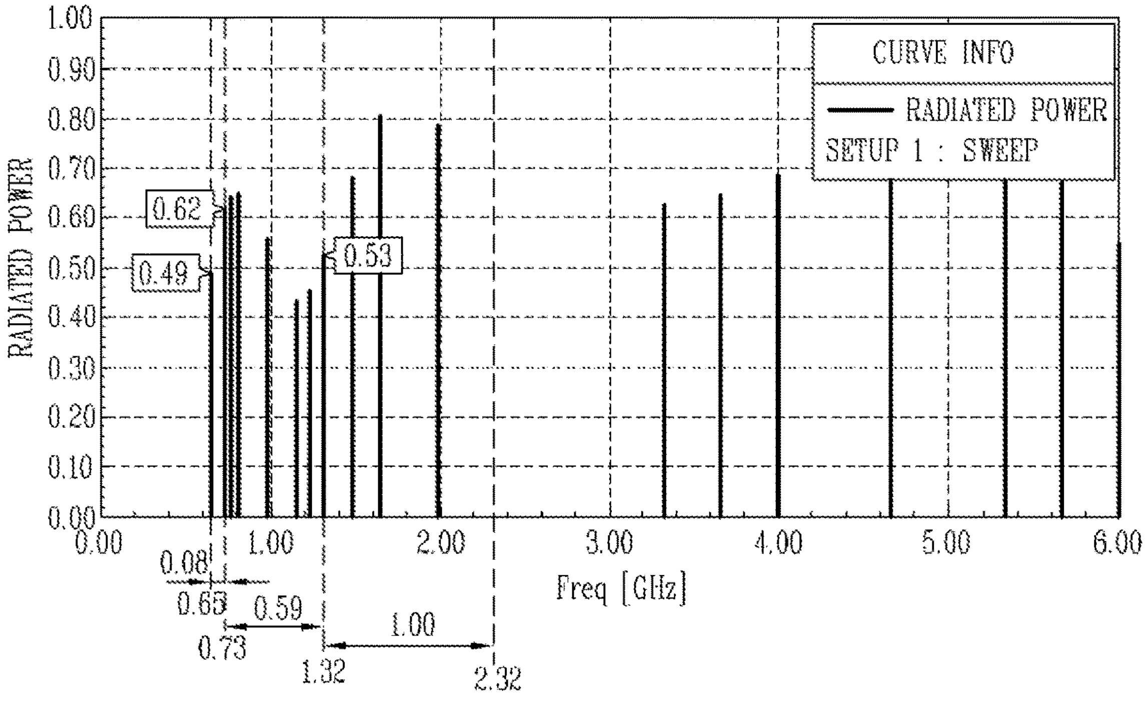

A multi-mode antenna proposed in the present disclosure may operate in multiple bands. In relation to this, FIGS. 14A and 14B show radiation coefficient characteristics and radiation efficiency characteristics of a multi-mode antenna according to an embodiment. More specifically, FIG. 14A shows reflection coefficient characteristics of an antenna 1100 including first to third radiators 1110 to 1130 as in FIGS. 7, 11, 13A, and 13B. FIG. 14B shows radiation efficiency characteristics of an antenna 1100 including first to third radiators 1110 to 1130 as in FIGS. 7, 11, 13A, and 13B.

Referring to FIG. 14A, the antenna operates in first to fourth frequency bands for a VSWR (voltage standing wave ratio) of 2.5:1. That is, the antenna operates in a frequency band of 0.69 GHz to 6 GHz for a VSWR of 2.5:1. Accordingly, the antenna satisfies bandwidth characteristics of about 158% with respect to a center frequency.

Referring to FIGS. 7, 11, 13A, 13B, and 14A, the antenna operates in a bow-tie dipole mode (i.e., first mode) at frequencies corresponding to the first frequency band. The antenna operates in a monopole mode (i.e., second mode) at frequencies corresponding to the second frequency band. The antenna operates in a triangular patch mode (i.e., third mode) in the third frequency band. The antenna operates in a bow-tie/monopole harmonic mode (i.e., fourth mode) in the fourth frequency band.

Referring to FIG. 14B, the antenna operates with a radiation efficiency of about 50% or more in the first frequency band and the second frequency band. For example, the antenna operates with a radiation efficiency of about 62% at 0.73 GHz. The antenna operates with a radiation efficiency of 60% or more in the third frequency band. Also, the antenna operates with a radiation efficiency of about 70% in the fourth frequency band.

Referring to FIG. 14B, the antenna operates with a minimum radiation efficiency of 40% in the first to fourth frequency bands. More specifically, the antenna operates with a minimum radiation efficiency of 40% at about 0.69 to 6 GHz.

According to another aspect of the present disclosure, an antenna module including a transparent antenna provided in a display is proposed. In relation to this, referring to FIGS. 6, 7, and 13A, the antenna module may include a transparent antenna 1100 and a feeding unit 1150. The transparent antenna 1100 may be disposed on a transparent substrate, and operate to resonate in a plurality of frequency bands. The feeding unit 1150 may be disposed on the transparent substrate 1010, and may be composed of a feeding line 1150*a* for feeding a signal to the transparent antenna 1100 and ground lines 1150*b* operating as a ground.

The transparent antenna 1100 may include a first radiator 1100 in which a first metal pattern 1110*a* connected to the feeding line 1150*a* and a second metal pattern 1110*b* connected to the ground line 1150*b* are formed in a first axial direction on the transparent substrate 1010. The transparent antenna 1100 may further include a second radiator 1120 in which a third metal pattern 1130 connected to the feeding line 1150*a* is formed in a second axial direction on the transparent substrate 1010.

According to one embodiment, the first radiator 1110 may be a bow-tie antenna which is formed in such a way that the width of the first metal pattern 1110*a* and the second metal pattern 1110*b* increases at a predetermined angle. The second radiator 1120 may be a monopole antenna which is formed in such a way that the width of the third metal pattern increases in the second axial direction.

According to one embodiment, the first metal pattern 1110*a* and second metal pattern 1110*b* of the bow-tie antenna may have a slit 1111 of a predetermined length and width. The feeding unit 1150 may be formed of a structure in which the ground lines 1150*b* are spaced apart from each other by a predetermined distance on opposite sides of the feeding line 1150*a*. The first metal pattern 1110*a* may further include a matching stub pattern 1112 formed perpendicular to the slit 1111. The width of the matching stub pattern 1112 may be smaller than the width of the feeding line 1150*a*.

According to an embodiment, the feeding unit 1150 may be formed of a structure in which the ground lines 1150*b* are spaced apart from each other by a predetermined distance on opposite sides of the feeding line 1150*a*. The transparent antenna 1100 may further include a third radiator 1130 which is connected to one of the ground lines 1150*b* and formed of a fourth metal pattern spaced apart from the feeding line 1150*a* by a predetermined distance. The third radiator 1130 may be formed of a parasitic metal pattern having a triangular shape, and resonate in a third frequency band higher than the second frequency band.

According to an embodiment, at least one of the plurality of radiators of the transparent antenna 1100 may operate in the higher order mode. In relation to this, the antenna 1100 may operate to resonate in a fourth frequency band higher than the first frequency band and the third frequency band by the first radiator 1110. In this case, the fourth frequency band may be a band of about 4.5 to 6.0 GHz. The first radiator 1110 may operate to resonate in a fourth frequency band in a higher order mode of a bow-tie antenna corresponding to the first radiator 1110. Meanwhile, the bow-tie antenna may operate as an antenna in the fourth frequency band, and also may operate as an antenna in the fourth frequency band by the slit 1111 formed in the bow-tie antenna. Accordingly, a decrease in efficiency may be compensated for by radiation caused by the slit 1111 since the bow-tie antenna operates in the higher order mode.

Moreover, the antenna 1100 may operate to resonate in the second frequency band and the fourth frequency band by the second radiator 1120. The second radiator 1120 may operate to resonate in the fourth frequency band in the higher order mode of a monopole antenna corresponding to the second radiator 1120.

A multi-mode/multi-band antenna proposed in the present disclosure may include a plurality of antennas. In relation to this, FIG. 15 shows a plurality of antennas operating in multiple modes and a configuration for controlling them.

Figure 15:
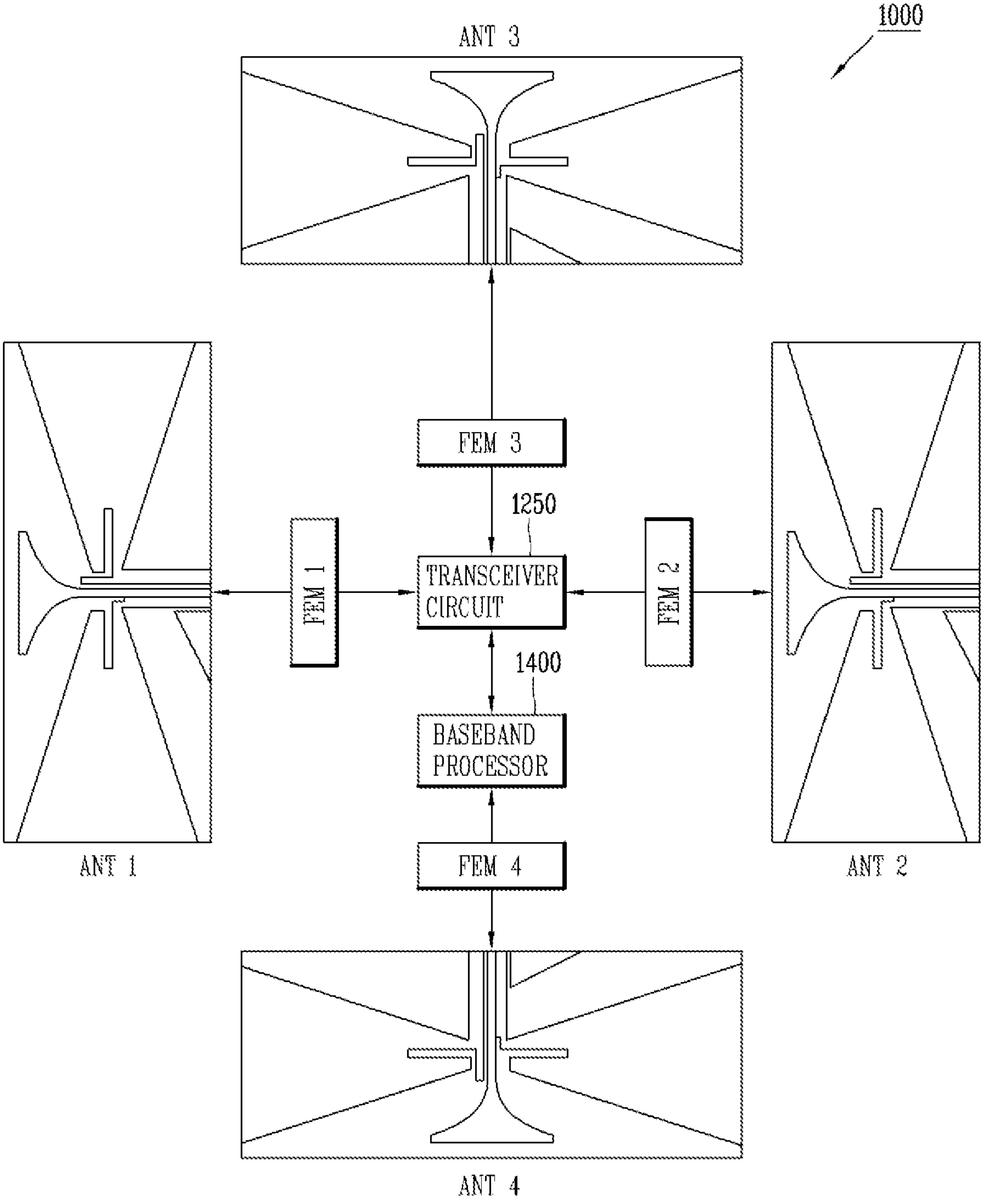
FIG. 15 shows a plurality of antennas operating in multiple modes and a configuration for controlling them.

Referring to FIG. 15, the antenna may include a plurality of antennas ANT1 to ANT4 disposed in different regions. In relation to this, the number of the plurality of antennas ANT1 to ANT4 is not limited to 4, but may be 2, 4, 6, or 8 depending on applications. For convenience of explanation, the following description will be described on the assumption that there are four antennas. The processor 1440 may perform multiple input multiple output (MIMO) through two or more of the plurality of antennas ANT1 to ANT4.

Referring to FIGS. 6 to 15, each antenna ANT1 to ANT4 may be operably coupled to the transceiver circuit 1250 and the processor 1400. According to an embodiment, a plurality of antennas ANT1 to ANT4 corresponding to an antenna module may be disposed inside the electronic device and perform multiple input multiple output.

The processor 1400 may perform carrier aggregation while performing multiple input multiple output (MIMO). To this end, the processor 1400 may control the transceiver circuit to perform multiple input multiple output (MIMO) through two or more of the plurality of antennas ANT1 to ANT4 and perform carrier aggregation (CA) by using at least one of the first to third radiators 1110 to 1130 of the antenna 1100.

The plurality of antennas may be configured to include the first antenna ANT1 to the fourth antenna ANT4. In relation to this, the first antenna ANT1 to fourth antenna ANT4 may be disposed on the left, right, top, and bottom of the electronic device. However, the locations of the first antenna ANT1 to fourth antenna ANT4 are not limited to this, but may vary depending on applications.

The transparent antenna 1100 explained in the present disclosure may be implemented as a transparent antenna by using a metal mesh grid structure or a transparent material. Accordingly, the first antenna ANT1 to fourth antenna ANT4 configured as the transparent antenna 1100 may be disposed on a transparent material substrate or transparent film inside the display 151 of the electronic device.

The first antenna ANT1 to fourth antenna ANT4 may be operably coupled to a first front end module FEM1 to fourth front end module FEM4, respectively. In relation to this, the first front end module FEM1 to fourth front end module FEM4 each may have a phase controller, a power amplifier, and a receiving amplifier. The first front end module FEM1 to fourth front end module FEM4 each may include some components of the transceiver circuit 1250 corresponding to an RFIC.

The baseband processor 1400 may be operably coupled to the first front end module FEM1 to fourth front end module FEM4. The processor 1400 may include some components of the transceiver circuit 1250 corresponding to an RFIC. The processor 1400 may include a baseband processor 1400 corresponding to a modem. The processor 1400 may be provided in the form of SoC (System on Chip) so as to include some components of the transceiver circuit 1250 corresponding to an RFIC and the baseband processor 1400 corresponding to a modem. However, the processor 1400 is not limited to the configuration of FIG. 12, but may vary depending on applications.

As described previously, the multi-mode/multi-band antenna may include a plurality of antennas ANT1 to ANT4 on a display of the electronic device in the form of a transparent antenna, and may be operably coupled to the transceiver circuit 1250. The processor 1400 may control the transceiver circuit 1250 so as to perform multiple input multiple output (MIMO) through the plurality of antennas ANT1 to ANT4.

The baseband processor 1400 may control the first front end module FEM1 to fourth front end module FEM4 so as to radiate signals through at least one of the first antenna ANT1 to fourth antenna ANT4. In relation to this, an optimum antenna may be selected based on the quality of signals received through the first antenna ANT1 to fourth antenna ANT4.

The baseband processor 1400 may control the first front end module FEM1 to fourth front end module FEM4 so as to perform multiple input multiple output (MIMO) through two or more of the first antenna ANT1 to fourth antenna ANT4. In relation to this, an optimum antenna combination may be selected based on the quality and interference level of signals received through the first antenna ANT1 to fourth antenna ANT4.

The baseband processor 1400 may control the first front end module FEM1 to fourth front end module FEM4 so as to perform carrier aggregation (CA) through at least one of the first antenna ANT1 to fourth antenna ANT4. In relation to this, carrier aggregation (CA) may be performed through a single antenna, since the first antenna ANT1 to fourth antenna ANT4 perform multiple resonances in multiple bands among the first to fourth frequency bands.

The processor 1400 may determine signal quality for each antenna in first and second bands. The baseband processor 1400 may perform carrier aggregation (CA) through one antenna in the first band and another antenna in the second band. Here, the first band and the second band may be one or more of the first to fourth frequency bands.

It is to be clearly understood by those skilled in the art that various changes and alterations may be made to the foregoing embodiments related to a multi-mode/multi-band antenna and an electronic device controlling the same without departing from the spirit and scope of the present disclosure. Therefore, it should be understood that such various modifications and alternations for the implementations fall within the scope of the appended claims.

An electronic device explained in the present disclosure may send and receive information simultaneously from various entities such as a peripheral electronic device, an external device, or a base station. If necessary, referring to FIGS. 1 to 15, the electronic device may perform multiple input multiple output (MIMO) through the antenna module 1100, the transceiver circuit 1250 for controlling the same, and the baseband processor 1400. By performing multiple input multiple output (MIMO), communication capacity and/or the reliability of information transmission and reception may be improved. Accordingly, the electronic device can transmit or receive different information to or from various entities at the same time to improve a communication capacity. This can improve the communication capacity of the electronic device through the MIMO without a bandwidth extension.

Alternatively, the electronic device may simultaneously receive the same information from various entities, so as to improve reliability for surrounding information and reduce latency. Accordingly, URLLC (Ultra Reliable Low Latency Communication) can be performed in the electronic device and the electronic device can operate as a URLLC UE. To this end, a base station performing scheduling may preferentially allocate a time slot for the electronic device operating as the URLLC UE. For this, some of specific time-frequency resources already allocated to other UEs may be punctured.

As described above, the plurality of antennas ANT1 to ANT4 may perform wideband (broadband) operation in a first band and a second band. Accordingly, the baseband processor 1400 can perform MIMO through some of the plurality of antenna elements ANT1 to ANT4 in the frequency band. Also, the baseband processor 1400 can perform MIMO through some of the plurality of antenna elements ANT1 to ANT4 in the second band. In this regard, the baseband processor 1400 can perform MIMO by using array antennas that are sufficiently spaced apart from each other and disposed by being rotated at a predetermined angle. This can improve isolation between the first and second signals within the same band.

One or more of the first to fourth antennas ANT1 to ANT4 within the electronic device may operate as radiators in a first band. Meanwhile, one or more of the first to fourth antennas ANT1 to ANT4 may operate as a radiator in a second band. Here, the first band and the second band may be one or more of the first to fourth frequency bands, respectively.

According to an embodiment, the processor 1400 may perform multiple input multiple output (MIMO) through two or more of the first to fourth antennas ANT1 to ANT4 in the first band. Meanwhile, the processor 1400 may perform multiple input multiple output (MIMO) through two or more of the first to fourth antennas ANT1 to ANT4 in the second band.

In relation to this, if the signal quality of two or more antennas in the first band is all equal to or lower than a threshold, the baseband processor 1400 may send a time/frequency resource request for the second band to the base station. Accordingly, once time/frequency resources for the second band are allocated, the processor 1400 may perform multiple input multiple output (MIMO) through two or more of the first to fourth antennas ANT1 to ANT4 by using those resources.

Likewise, multiple input multiple output (MIMO) may be performed by using two or more identical antennas when resources for the second band are allocated. Thus, the corresponding front end modules FEM are turned on/off again as the antennas are changed, thereby preventing wasteful power consumption. Also, the corresponding front end modules FEM are turned on/off again as the antennas are changed, thereby preventing a performance degradation caused by the settling time of an electric part, for example, an amplifier.

Meanwhile, when resources for the second band are allocated, at least one of the two or more antennas may be changed, and multiple input multiple output (MIMO) may be performed through such antennas. Accordingly, once it is determined that it is difficult to perform communication through these antennas because of different radio wave environments for the first and second bands, other antennas may be used.

According to another implementation, the baseband processor 1400 may control the transceiver circuit 1250 to receive the second signal of the second frequency band while receiving the first signal of the first frequency band through one of the first to fourth antennas ANT1 to ANT4. In this case, there may be provided an advantage that the baseband processor 1400 can advantageously perform carrier aggregation (CA) through one antenna.

Therefore, the processor 1400 can perform carrier aggregation (CA) through a combination of the first band and the second band. When it is necessary to transmit or receive a large amount of data for an electronic device, a broadband reception can be allowed through the CA.

Accordingly, eMBB (Enhanced Mobile Broad Band) communication can be performed in the electronic device and the electronic device can operate as an eMBB UE. To this end, the base station that performs scheduling may allocate a broadband frequency resource to the electronic device that operates as the eMBB UE. To this end, the CA may be performed on frequency bands that are available, except for frequency resources already allocated to other UEs.

It will be clearly understood by those skilled in the art that various changes and modifications to the aforementioned implementations related to a multi-mode/multi-band antenna and an electronic device for controlling the same are made without departing from the idea and scope of the present disclosure. Therefore, it should be understood that such various modifications and alternations for the implementations fall within the scope of the appended claims.

Figure 16A:
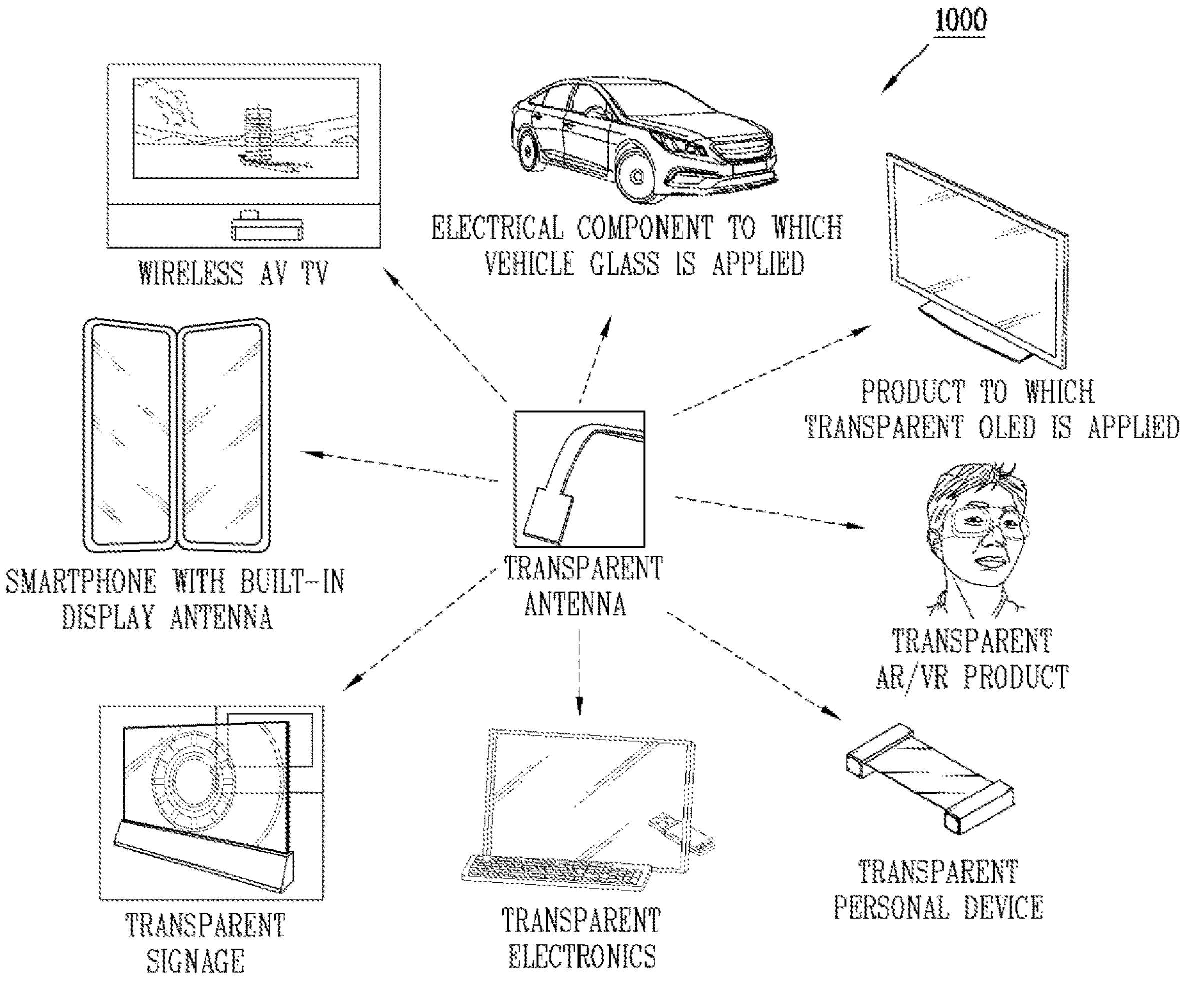
FIG. 16A shows an example in which a transparent antenna proposed in the present disclosure is applied to a variety of electronic devices.

A transparent antenna operating in multiple modes which is proposed in the present disclosure is applicable to a variety of electronic devices. In relation to this, FIG. 16A shows an example in which a transparent antenna proposed in the present disclosure is applied to a variety of electronic devices. Referring to FIGS. 15 and 16A, the electronic device 1000 may be at least one of a mobile terminal, signage, display equipment, transparent AR/VR equipment, a vehicle, or a wireless audio/video device. Meanwhile, the antenna 1100 operating in multiple modes may be a transparent antenna disposed on a display or inside the display.

Figure 16B:
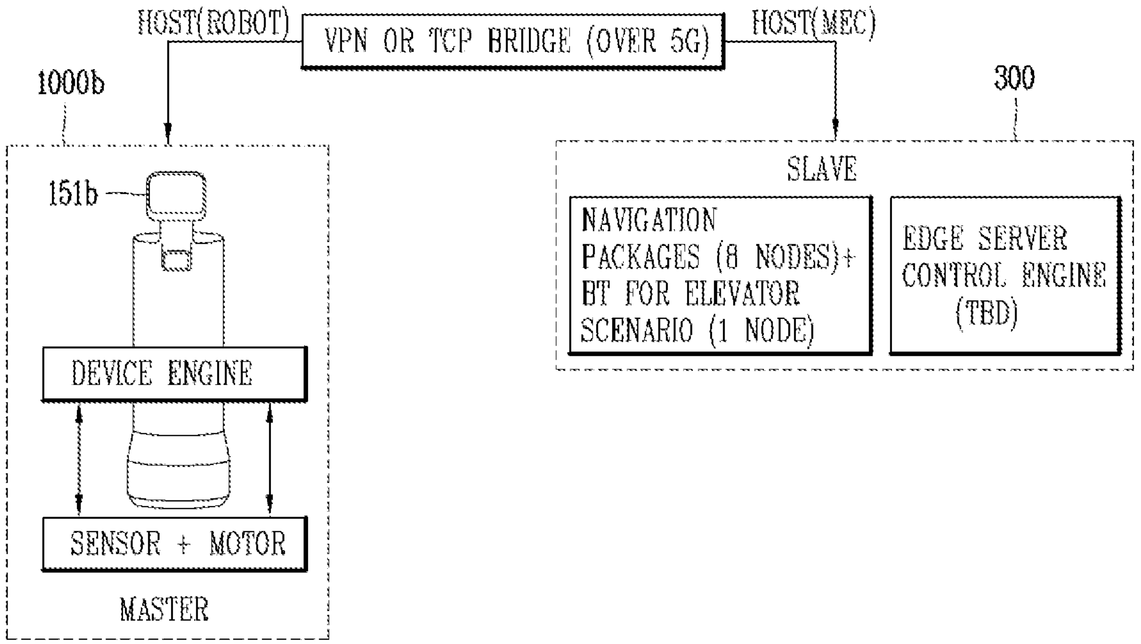
FIG. 16B shows an embodiment in which a transparent antenna proposed in the present disclosure is applied to a robot.

Meanwhile, FIG. 16B shows an embodiment in which a transparent antenna proposed in the present disclosure is applied to a robot. Referring to FIGS. 6, 7, 11, 13A, 13B, and 16B, a transparent 1100 may be disposed on a display **151*b* of a robot 1000*b* or inside the display 151*b*. The transparent antenna 1100 may be implemented in one of various combinations of the first to third radiators 1110 to 1130 and operate as a multi-mode/multi-band antenna. The transparent antenna 1100 may operate in an LTE band and/or a 5G Sub6 band through one of a plurality of combinations of radiators, that is, one of various combinations of the first to third radiators 1110 to 1130**.

The robot **1000*b* may interface with the server 300 via a communication network under control of the processor 180 such as a device engine. In this case, the communication network may be a 5G communication network. The communication network may be implemented as a VPN or TCP bridge. The robot 1000*b* may access an MEC server 300 via the communication network. Since the robot 1000*b* interface with the MEC server 300, such a robot/network system may be referred to as a cloud robotic system. The cloud robotics system is a system in which a cloud server such as the MEC server 300 handles functions required for the robot 1000*b*** to perform assigned tasks.

As set forth above, a multi-mode/multi-band antenna according to the present disclosure and an electronic device for controlling the same have been described. A wireless communication system including such a multi-mode/multi-band antenna, an electronic device for controlling the same, and a base station will be described below. In relation to this, FIG. 17 is an exemplary block diagram of a wireless communication system that is applicable to methods proposed in the present disclosure.

Figure 17:
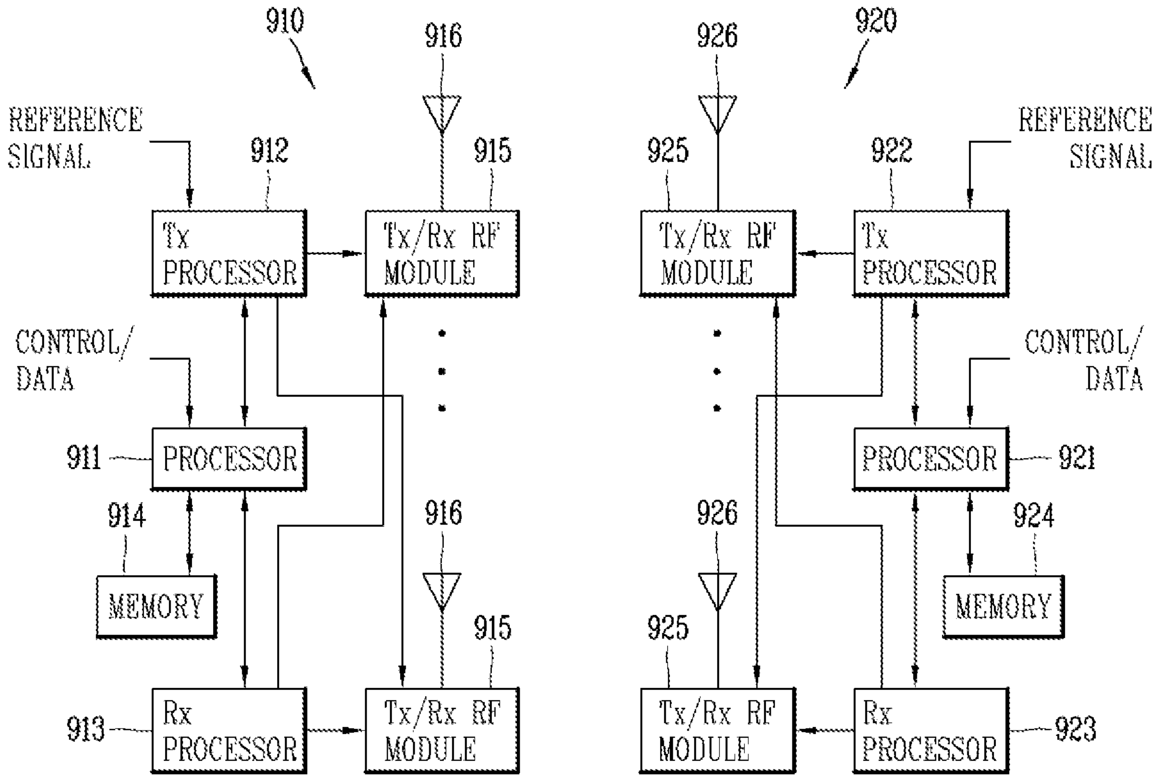
FIG. 17 is an exemplary block diagram of a wireless communication system that is applicable to methods proposed in the present disclosure.

Referring to FIG. 17, the wireless communication system may include a first communication device 910 and/or a second communication device 920. The term 'A and/or B' may be interpreted as having the same meaning as 'at least one of A and B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper (high-level) layer packet from a core network may be provided to the processor 911. The processor implements the function of an L2 layer. In DL, the processor may provide multiplexing between a logical channel and a transport channel and radio resource allocation to the second communication device 920, and may be in charge of signaling to the second communication device. The Tx processor 912 may implement various signal processing functions for an L1 layer (i.e., a physical layer). The signal processing function may facilitate forward error correction (FEC) in the second communication device, and include coding and interleaving. An encoded and modulated symbol may be divided into parallel streams. Each stream may be mapped to an OFDM subcarrier wave, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication device may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication device. When a plurality of spatial streams are destined for the second communication device, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted over the physical channel by the first communication device. The corresponding data and control signal may then be provided to the processor 921.

UL (communication from the second communication device to the first communication device) may be processed in the first communication device 910 in a similar manner to that described with respect to the receiver function in the second communication device 920. The Tx/Rx modules 925 may receive signals via the antennas 926, respectively. The Tx/Rx modules may provide RF carriers and information to the RX processor 923, respectively. The processor 921 may operate in conjunction with the memory 924 in which a program code and data are stored. The memory may be referred to as a computer-readable medium.

In the above, a transparent antenna operating in a 5G Sub6 band and an electronic device for controlling the same have been described. Technical effects of such an electronic device having a transparent antenna will be described below.

According to an embodiment, an antenna of a transparent material may be provided which operates in a 4G LTE band and a 5G Sub6 band.

According to an embodiment, an antenna structure may be provided which operates as a single antenna module over a wide band that extends to a 4G LTE low band and a 5G Sub6 band may be provided.

According to an embodiment, a multi-mode/multi-band antenna structure may be provided which operates as a single antenna module over a wide band that extends to a 4G LTE low band and a 5G Sub6 band through a combination structure of a monopole and a bow-tie radiator.

According to an embodiment, a plurality of transparent antennas may be disposed on a display of an electronic device, and communication performance may be improved through multiple input multiple output (MIMO) and/or carrier aggregation (CA).

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned disclosure, design and operations of a transparent antenna operating in a 5G Sub-6 band and an electronic device controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device comprising:

an antenna disposed on a substrate disposed inside the electronic device and operable to resonate in a plurality of frequency bands; and a feeding unit disposed on the substrate and composed of a feeding line feeding a signal to the antenna and ground lines operating as a ground, the antenna including:

a first metal pattern connected to the feeding line, the first metal pattern including a first sub pattern and a second sub pattern; and a second metal pattern connected to the ground lines, the second metal pattern including a third sub pattern, wherein the first sub pattern and the third sub pattern are disposed on opposite sides with respect to the second sub pattern, wherein the third sub pattern connected to the ground lines is disposed between the second sub pattern and the ground lines, wherein the first metal pattern and the second metal pattern of a first radiator each have a slit of a predetermined length and width, and wherein the first metal pattern further includes a matching stub pattern formed perpendicular to the slit of the first metal pattern, and a width of the matching stub pattern is smaller than a width of the feeding line.

2. The electronic device of claim 1, wherein the first sub pattern and the third sub pattern form the first radiator in a first axial direction of the substrate, wherein the second sub pattern connected to the feeding line is form a second radiator in a second axial direction orthogonal to the first axial direction, and wherein the antenna operates to resonate in a first frequency band by the first radiator, and operates to resonate in a second frequency band higher than the first frequency band by the second radiator.

3. The electronic device of claim 2, wherein the first radiator is a bow-tie antenna which is formed in such a way that a width of the first metal pattern and the width of the second metal pattern increases at a predetermined angle.

4. The electronic device of claim 2, wherein the second radiator is a monopole antenna which is formed in such a way that a width of the second sub pattern increases in the second axial direction.

5. The electronic device of claim 4, wherein the monopole antenna is configured as a loaded monopole antenna whose end portion is formed of at least one of a circular structure, a semi-circular structure, a triangular structure, and a tapered structure.

6. An electronic device comprising:

an antenna disposed on a substrate disposed inside the electronic device and operable to resonate in a plurality of frequency bands; and a feeding unit disposed on the substrate and composed of a feeding line feeding a signal to the antenna and ground lines operating as a ground, the antenna including:

a first metal pattern connected to the feeding line, the first metal pattern including a first sub pattern and a second sub pattern;

a second metal pattern connected to the ground lines, the second metal pattern including a third sub pattern, wherein the first metal pattern and second metal pattern form a first radiator operated in a first frequency band, and wherein the second sub pattern forms a second radiator operated in a second frequency band higher than the first frequency band; and a third radiator which is formed of a fourth metal pattern spaced a predetermined distance apart from one of the ground lines.

7. The electronic device of claim 6, wherein the third radiator is formed of a parasitic metal pattern having a triangular shape, and resonates in a third frequency band higher than the second frequency band.

8. The electronic device of claim 7, wherein the antenna operates to resonate in a fourth frequency band higher than the first frequency band and the third frequency band by the first radiator, and the first radiator operates to resonate in a fourth frequency band in a higher order mode of a bow-tie antenna corresponding to the first radiator.

9. The electronic device of claim 6, wherein the first to third radiators constituting the antenna are implemented as a transparent material metal or a metal mesh grid.

10. The electronic device of claim 6, further comprising a transceiver circuit formed in an un-transparent region and configured to be connected to the feeding line and transmit signals in a plurality of frequency bands, wherein the transceiver circuit transmits signals to the antenna through the feeding line to radiate signals of a low band LB to high band HB of an LTE communication system and signals of a 5G Sub6 band through the antenna.

11. The electronic device of claim 10, wherein the antenna includes a plurality of antennas disposed in different regions, and the electronic device further comprises a processor operably coupled to the transceiver circuit and configured to control the transceiver circuit, wherein the processor performs multiple input multiple output (MIMO) through two or more of the plurality of antennas.

12. The electronic device of claim 10, further comprising a processor operably coupled to the transceiver circuit and configured to control the transceiver circuit, wherein the processor controls the transceiver circuit to perform carrier aggregation using at least one of the first to third radiators of the antenna.

13. The electronic device of claim 10, wherein the antenna includes a plurality of antennas disposed in different regions, and the electronic device further comprises a processor operably coupled to the transceiver circuit and configured to control the transceiver circuit, wherein the processor controls the transceiver circuit to perform multiple input multiple output (MIMO) through two or more of the plurality of antennas and perform carrier aggregation (CA) by using at least one of the first to third radiators of the antenna.

14. The electronic device of claim 13, wherein the electronic device is a mobile terminal, signage, display equipment, transparent AR/VR equipment, a vehicle, or a wireless audio/video device, and the antenna is a transparent antenna disposed on a display or inside the display.

15. An antenna module comprising:

a transparent antenna disposed on a transparent substrate, and operating to resonate in a plurality of frequency bands;

a feeding unit disposed on the transparent substrate, and including a feeding line for feeding a signal to the transparent antenna and ground lines operating as a ground; and a third radiator which is connected to one of the ground lines and formed of a fourth metal pattern spaced a predetermined distance apart from one of the ground lines, wherein the transparent antenna includes:

a first metal pattern connected to the feeding line, the first metal pattern including a first sub pattern and a second sub pattern; and a second metal pattern connected to the ground lines, the second metal pattern including a third sub pattern, wherein the first sub pattern and the third sub pattern are disposed on opposite sides with respect to the second sub pattern, and wherein the third sub pattern connected to the ground lines is disposed between the second sub pattern and the ground lines.

16. The antenna module of claim 15, wherein the first sub pattern and the third sub pattern form a first radiator in a first axial direction of the transparent substrate, wherein the second sub pattern connected to the feeding line is form a second radiator in a second axial direction orthogonal to the first axial direction, and wherein the first radiator is a bow-tie antenna which is formed in such a way that a width of the first metal pattern and the width of the second metal pattern increases at a predetermined angle, and the second radiator is a monopole antenna which is formed in such a way that a width of the second sub pattern increases in the second axial direction.

17. The antenna module of claim 16, wherein the first metal pattern and the second metal pattern of the first radiator each have a slit of a predetermined length and width, the feeding unit is formed of a structure in which the ground lines are spaced apart at both sides of the feeding line at a predetermined interval, the first metal pattern of the first radiator further includes a matching stub pattern formed perpendicular to the slit of the first metal pattern, and a width of the matching stub pattern is narrower than a width of the feeding line.

18. The antenna module of claim 15, wherein the feeding unit is formed of a structure in which the ground lines are spaced apart from each other by a predetermined distance on opposite sides of the feeding line, wherein the third radiator is formed of a parasitic metal pattern having a triangular shape, and resonates in a third frequency band higher than the second frequency band.

* * * * *